United States Patent
Hufnagl-Abraham

(10) Patent No.: US 12,288,445 B2
(45) Date of Patent: Apr. 29, 2025

(54) NON-FUNGIBLE TOKENS AS GAMING AWARDS MARKETPLACE

(71) Applicant: IGT, Las Vegas, NV (US)

(72) Inventor: Klaus Hufnagl-Abraham, Graz (AT)

(73) Assignee: IGT, Las Vegas, NV (US)

( * ) Notice: Subject to any disclaimer, the term of this patent is extended or adjusted under 35 U.S.C. 154(b) by 236 days.

(21) Appl. No.: 17/890,755

(22) Filed: Aug. 18, 2022

(65) Prior Publication Data

US 2024/0062621 A1  Feb. 22, 2024

(51) Int. Cl.
*G07F 17/32* (2006.01)
*H04L 9/00* (2022.01)

(52) U.S. Cl.
CPC ...... *G07F 17/3251* (2013.01); *G07F 17/3225* (2013.01); *H04L 9/50* (2022.05)

(58) Field of Classification Search
None
See application file for complete search history.

(56) References Cited

U.S. PATENT DOCUMENTS

| | | |
|---|---|---|
| 8,190,507 B2 | 5/2012 | Arezina et al. |
| 10,885,740 B2 | 1/2021 | Higgins et al. |
| 11,210,895 B1 | 12/2021 | Huke et al. |
| 2014/0039941 A1 | 2/2014 | Alvernaz et al. |
| 2019/0130701 A1* | 5/2019 | Simons ............... H04L 9/3226 |
| 2021/0248594 A1 | 8/2021 | Yantis et al. |
| 2021/0295324 A1 | 9/2021 | Kerseboom et al. |
| 2022/0092940 A1 | 3/2022 | Huke et al. |
| 2022/0198562 A1 | 6/2022 | Cella et al. |
| 2022/0229883 A1 | 7/2022 | Khandelwal et al. |
| 2023/0093031 A1* | 3/2023 | Sharda ............... G06Q 20/123 705/39 |
| 2023/0119838 A1* | 4/2023 | Meyers ............... A63F 13/35 463/42 |
| 2023/0410128 A1* | 12/2023 | Liao ................ G06Q 30/018 |

\* cited by examiner

*Primary Examiner* — Jason T Yen
(74) *Attorney, Agent, or Firm* — Neal, Gerber & Eisenberg, LLP

(57) ABSTRACT

Systems and methods that utilize non-fungible tokens in association with the occurrence of gaming environment events and offer a marketplace to transact against such non-fungible tokens.

20 Claims, 9 Drawing Sheets

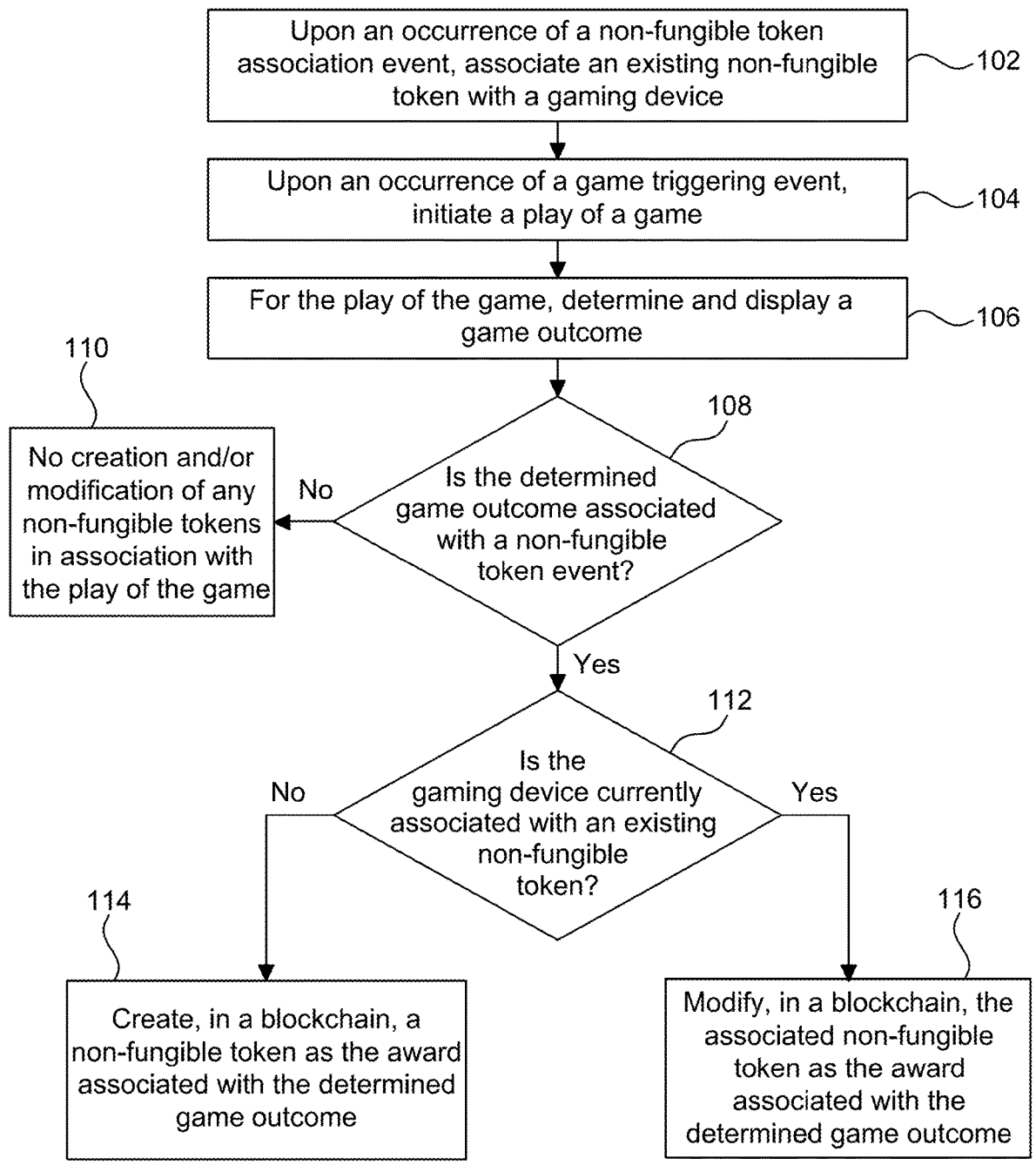

FIG. 2A

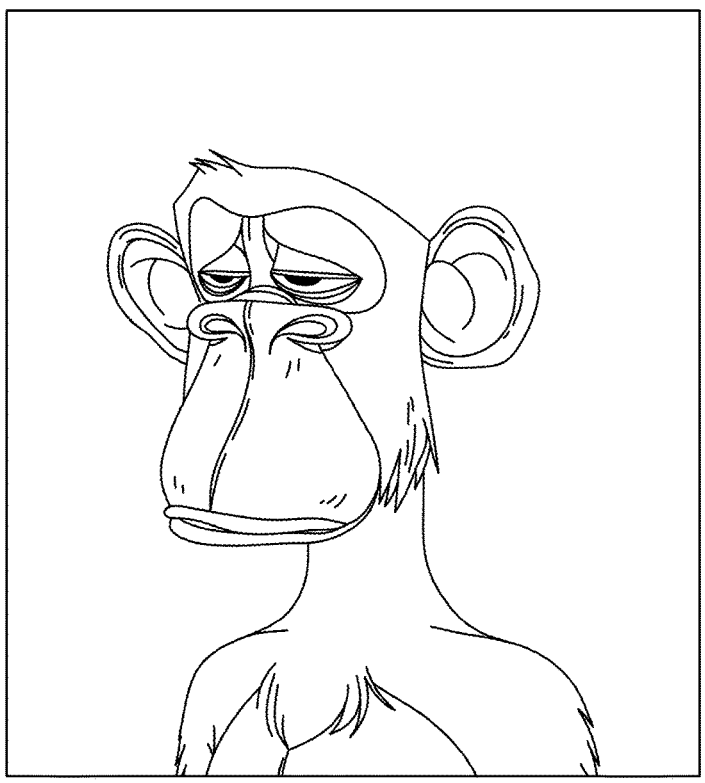

2116, 2118

You have associated your unique IGT Monkey Prince NFT with this gaming device. Based on this NFT, the gaming device has been modified to only display fruit symbols.

In addition to storing your preferences, this NFT has the following attributes:

Eyes: Sleepy          Mouth: Bored          Clothes: None
Earring: None         Hat: None From plays of games, you can win upgrades to the eyes or mouth of this NFT.

You can also win Clothes, Earrings and/or a Hat.

Good luck

FIG. 2C
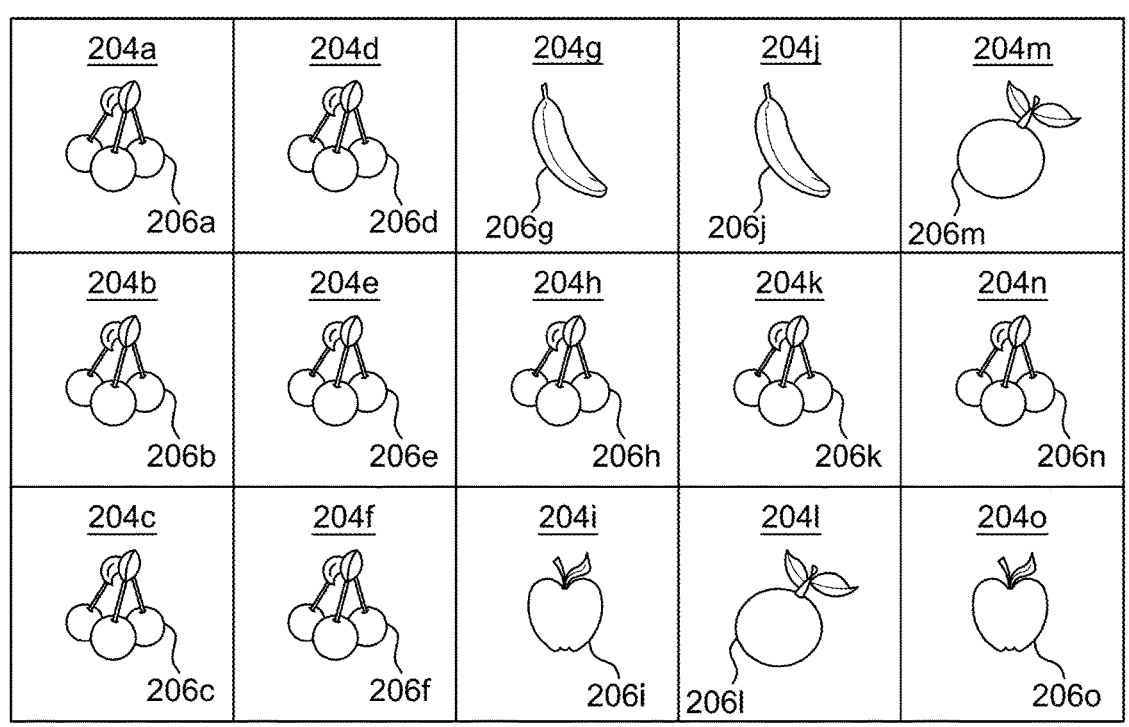
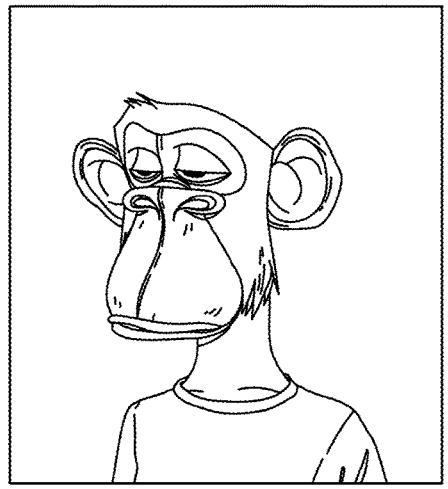
Great win. As an award for this symbol combination, the clothes of your unique IGT Monkey Prince NFT have been upgraded from no clothes to the displayed shirt.
Only 2% of IGT Monkey Prince NFTs have this shirt and none of them have the same combination of attributes as your NFT is

NON-FUNGIBLE TOKENS AS GAMING AWARDS MARKETPLACE

BACKGROUND

In various embodiments, the systems and methods of the present disclosure utilize non-fungible tokens in association with the occurrence of gaming environment events and offer a marketplace to transact against such non-fungible tokens.

Developing and maintaining a loyal customer base is one component of operating a successful gaming establishment. To develop a loyal customer base, gaming establishments, such as casinos, attempt to generate interactions with their patrons that provide a unique and personalized experience. As an example, gaming establishments offer patrons the opportunity to participate in a player loyalty program via which patrons are offered various promotions that encourage the patron to return to the gaming establishment.

BRIEF SUMMARY

In certain embodiments, the present disclosure relates to a system including a processor, and a memory device that stores a plurality of instructions. When executed by the processor, the instructions cause the processor to cause a display, by a display device, of a first visual representation of a non-fungible token associated, in a blockchain, with a first user, the non-fungible token being created, in the blockchain, in association with an activity that occurred at a gaming device. When executed by the processor responsive to a marketplace transaction occurring between the first user and a second user in association with the non-fungible token, the instructions cause the processor to cause a modification, in the blockchain, of the non-fungible token, cause a modification of a first account associated with the first user, and cause a modification of a second account associated with the second user.

In certain embodiments, the present disclosure relates to a system including a processor, and a memory device that stores a plurality of instructions. When executed by the processor, the instructions cause the processor to cause a display, by a display device, of a visual representation of a non-fungible token comprising a first attribute and created, in a blockchain, in association with an activity that occurred at a gaming device. When executed by the processor during a first period of time, the instructions cause the processor to enable a first marketplace transaction to occur in association with at least the first attribute of the non-fungible token, the first marketplace transaction being at least partially based on a first value of the first attribute of the non-fungible token. When executed by the processor during a second, different period of time, the instructions cause the processor to enable a second marketplace transaction to occur in association with at least the first attribute of the non-fungible token, the second marketplace transaction being at least partially based on a second, different value of the first attribute of the non-fungible token.

In certain embodiments, the present disclosure relates to a method of operating a system, the method including displaying, by a display device, a first visual representation of a non-fungible token associated, in a blockchain, with a first user, the non-fungible token being created, in the blockchain, in association with an activity that occurred at a gaming device. Responsive to a marketplace transaction occurring between the first user and a second user in association with the non-fungible token, the method includes causing, by a processor, a modification, in the blockchain, of the non-fungible token, causing, by the processor, a modification of a first account associated with the first user, and causing, by the processor, of a modification of a second account associated with the second user.

Additional features are described herein, and will be apparent from the following Detailed Description and the figures.

BRIEF DESCRIPTION OF THE FIGURES

FIG. 1 is a flow chart an example process for operating a system which creates and/or modifies a non-fungible token on a user's behalf.

FIGS. 2A, 2B and 2C are example graphical user interfaces displayed on a display device of an electronic gaming machine illustrating an association of a non-fungible token with a gaming session of the electronic gaming machine and a play of a game that results in a modification of an attribute of the associated non-fungible token.

DETAILED DESCRIPTION

Figure 2B:
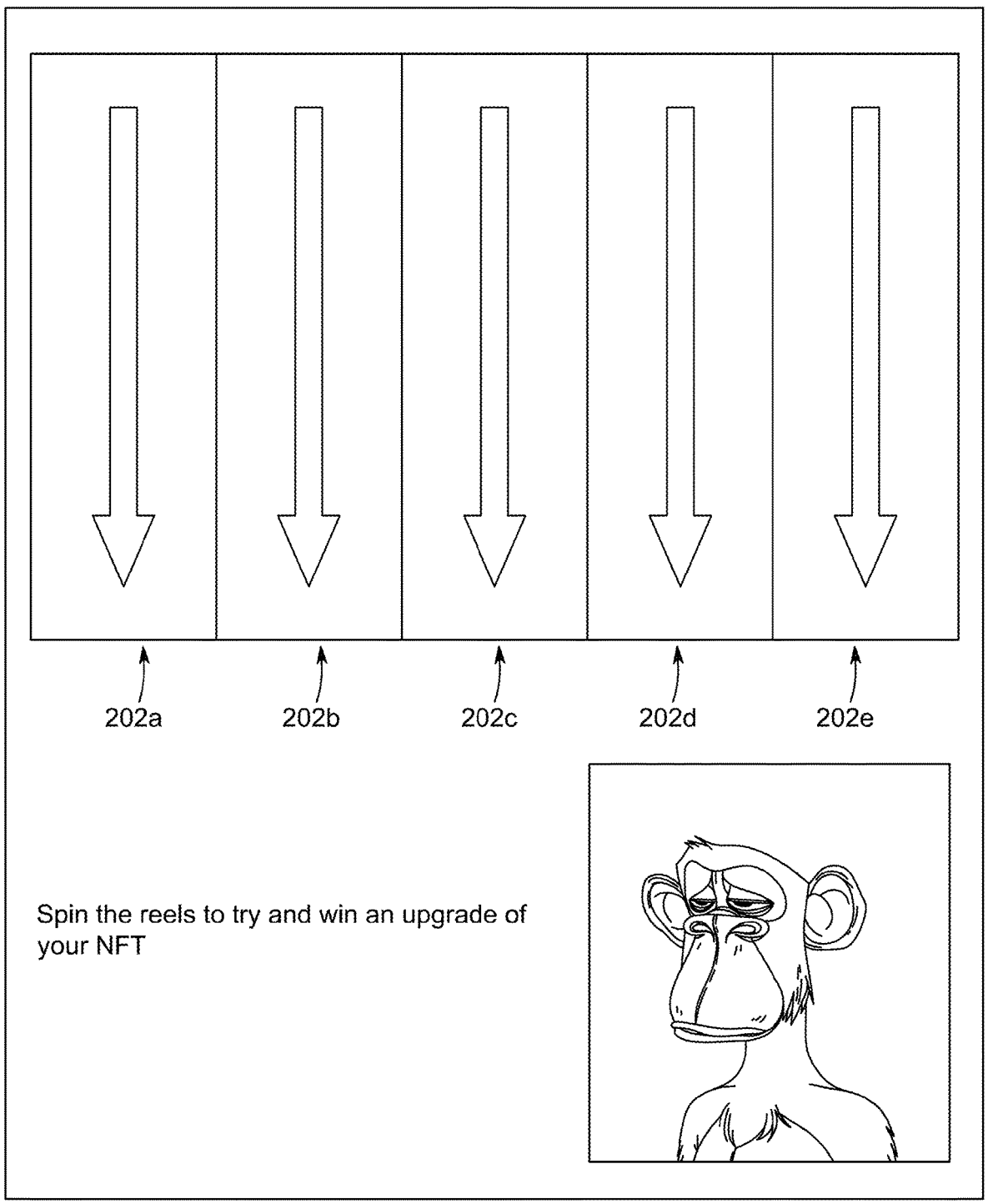

In various embodiments, the systems and methods of the present disclosure distribute and/or modify one or more non-fungible tokens in association with one or more gaming sessions and offer a marketplace to transact against such non-fungible tokens.

In certain embodiments, if a non-fungible token event occurs in association with a gaming session and the gaming session is not already associated with a non-fungible token, the non-fungible token event qualifies as a non-fungible token creation event. In these embodiments, following the occurrence of such a non-fungible token creation event, the system operates with zero, one or more non-fungible token services to create a non-fungible token associated with the occurrence of the non-fungible token creation event. Such a non-fungible token, created in a blockchain ledger, is related to digital content captured and/or created in association with the occurrence of the non-fungible token creation event. For example, following a random determination of a designated outcome during a play of a game displayed by a gaming device that is not otherwise associated with any non-fungible tokens (i.e., the occurrence of the non-fungible token creation event), the system operates with a decentralized, open-source blockchain to cause the creation of a non-fungible token associated with digital content having one or more attributes or properties associated with the randomly determined designated outcome. As such, the created non-fungible token provides a digital asset associated with one or more events occurring in association with a gaming device wherein ownership of the digital asset may be verified via suitable blockchain technology.

More specifically, in various embodiments, as part of an event occurring at a gaming device not currently associated with any non-fungible tokens, the system of the present disclosure causes the creation, written in a block on a blockchain ledger, of a non-fungible token. Such a non-fungible token is a unique cryptographic entry that does not have a one-to-one value with other non-fungible tokens and is not interchangeable with other non-fungible tokens. Such a created non-fungible token comprises one or more attributes determined based on (or alternatively independent of) the event occurring at the gaming device. For example, as an award provided in association with one or more games played at a gaming device (or alternatively as one or more payouts provided in association with one more winning sporting event wagers placed), the system causes the creation of a non-fungible token having one or more attributes or properties (e.g., traits or components of the digital content of the non-fungible token such as colors used and/or images displayed). In this example, the attributes or properties of the non-fungible token are at least partially determined based on the one or more games played at the gaming device (or alternatively the one or more winning sporting event wagers placed). Such a configuration of utilizing non-fungible tokens enables certain users, such as players, to accumulate non-fungible tokens as a collectable digital asset commemorating their gaming experience.

In certain embodiments, in addition to or alternative from creating a non-fungible token upon an occurrence of a non-fungible token creation event, if a non-fungible token event occurs in association with a gaming session and the gaming session is already associated with a non-fungible token, the non-fungible token event qualifies as a non-fungible token modification event. In these embodiments, following the occurrence of such a non-fungible token modification event, the system operates with zero, one or more non-fungible token services to modify a non-fungible token associated with the occurrence of the non-fungible token modification event. Such a modified non-fungible token is related to digital content captured and/or created in association with the occurrence of the non-fungible token modification event. For example, following a random determination of a designated outcome during a play of a game displayed by a gaming device that is associated with a non-fungible token (i.e., the occurrence of the non-fungible token modification event), the system operates with a decentralized, open-source blockchain to cause a modification of a previously created non-fungible token. In this example, the modification is associated with digital content having one or more attributes or properties based on the randomly determined designated outcome.

More specifically, in various embodiments, as part of an event occurring at a gaming device currently associated with a non-fungible token, the system of the present disclosure causes the modification, written in a block on a blockchain ledger, of such a non-fungible token. Such a modified non-fungible token comprises one or more modifications to one or more attributes of the non-fungible token, wherein such modifications are based on (or alternatively independent of) the event occurring at the gaming device. For example, as an award provided in association with one or more games played at a gaming device (or alternatively as one or more payouts provided in association with one more winning sporting event wagers placed), the system causes the modification of one or more attributes or properties of an existing non-fungible token (e.g., updated traits to the digital content of the non-fungible token and/or updated customizations associated with a play of a game). Such an example illustrates how, in certain instances, modifications of one or more attributes or properties of a non-fungible token represent the form of winnings from plays of wagering games such that the more a user interacts with a gaming device, the more improved modifications to the attributes of an associated non-fungible token occur and the more lucrative that non-fungible token may become.

In various embodiments, in addition to employing a non-fungible token to memorialize part or all of a gaming session occurring at a gaming device, the system employs a non-fungible token to capture and track data associated with a user without requiring the user to otherwise identify themselves. In these embodiments, in view of certain users wanting to customize their gaming experience but otherwise remain anonymous, the system of the present disclosure utilizes non-fungible tokens as a vehicle to store various user data that, if the user prefers, qualifies as anonymous user data because the personal identity of the user is unknown by the system. In these embodiments, following a user making zero, one or more inputs to alter the settings of a gaming device, the system of the present disclosure causes the creation or modification, written in a block on a blockchain ledger, of a non-fungible token associated with such settings. Such settings associated with the non-fungible token are subsequently usable to alter the settings of another gaming device without the user having to reinput such alterations or identify themselves to the other gaming device (as would be the case if such settings were stored in association with a player tracking system). For example, upon one or more customizations occurring at a gaming device, such as one or more user audio/video preferences being received, the system causes the creation or modification of a non-fungible token associated with such customizations as attributes of the non-fungible token. In this example, the customizations associated with the non-fungible token are transferrable, via the non-fungible token, such that subsequent gaming sessions associated with the non-fungible token at the same gaming device (and/or at different gaming devices) employ such customizations. As such, the non-fungible tokens operate as an anonymous vehicle to enable the transfer of certain aspects of a user's gaming experience from one gaming session to another gaming session and from one gaming device to another gaming device. Such a configuration offers an alternative to player tracking systems for users that want to remain anonymous (i.e., not participate in being tracked by such player tracking systems) but still want their customizations to be retained by the system and/or want to earn benefits for their anonymously tracked interactions with the system.

In certain embodiments, in addition to or alternative from creating and/or modifying a non-fungible token based on one or more events occurring at a gaming device, the system operates with zero, one or more non-fungible token marketplaces, to enable one or more transactions associated with a non-fungible token obtained in association with a gaming session. In certain such embodiments, the system enables a user to obtain, such as procuring via the non-fungible token marketplace (and, in certain instances, independent of any events occurring at any gaming devices), a non-fungible token created and/or modified by another user in association with one or more events occurring at one or more gaming devices. In certain such embodiments, the system additionally or alternatively enables a user to obtain, such as procuring via the non-fungible token marketplace, one or more individual non-fungible token attributes or properties to modify an existing non-fungible token (e.g., upgraded traits to the digital content of the non-fungible token such as upgraded colors used and/or upgraded images displayed). In certain such embodiments, the system enables a user to dispose of, such as selling via the non-fungible token marketplace (and, in certain instances, independent of any events occurring at any gaming devices), a non-fungible token created and/or modified by that user in association with one or more events occurring at one or more gaming devices. In certain such embodiments, the system additionally or alternatively enables a user to dispose of, such as selling via the non-fungible token marketplace, one or more individual non-fungible token attributes or properties to modify an existing non-fungible token without otherwise disposing of that non-fungible token. In certain such embodiments, the system enables a user to trade, via the non-fungible token marketplace (and, in certain instances, independent of any events occurring at any gaming devices), a non-fungible token and/or an individual attribute of a non-fungible token created and/or modified by that user in association with one or more events occurring at one or more gaming devices for another non-fungible token and/or an individual attribute of a non-fungible token (whether or not that other non-fungible token (or non-fungible token attribute) was also created and/or modified in association with one or more events occurring at one or more gaming device). In these embodiments, the employment of a non-fungible token marketplace enables users to conduct, independent of any gaming activities, transactions associated with non-fungible tokens (e.g., buying/selling non-fungible tokens and/or buying/selling individual attributes or properties associated with non-fungible tokens) obtained in association with gaming activities, wherein such transactions are written in a block on a blockchain ledger. Such a configuration introduces liquidity to non-fungible tokens associated with gaming activities.

While certain embodiments of the present disclosure are directed to creating and/or modifying a unique non-fungible token owned by a user, such as a player, in association with one or more plays of a primary game, such as a primary wagering game, it should be appreciated that such embodiments may additionally or alternatively be employed in association with creating and/or modifying a unique non-fungible token owned by a user, such as a player, in association with one or more plays of a secondary game, such as a bonus game or a communal game and/or creating and/or modifying a unique non-fungible token owned by a user, such as a player, independent of any plays of any games. It should be further appreciated that a gaming device employed in association with a creation and/or modification of one or more non-fungible tokens may be any suitable personal gaming device, such as a mobile device executing an application; any suitable electronic gaming machine ("EGM") (such as a slot machine, a video poker machine, a video lottery terminal, a terminal associated with an electronic table game, a sporting event wagering terminal, a video keno machine, or a video bingo machine) which enables a player to play one or more games of chances, one or more games of skill (or partial skill), and/or place one or more sporting event wagers; any suitable slot machine interface board which is in communication with an EGM which enables a player to play one or more games of chances, one or more games of skill (or partial skill), and/or place one or more sporting event wagers; and/or any suitable combination of a server operating with a personal gaming device, an EGM, and/or a slot machine interface board associated with an EGM which enables a player to play one or more games of chances, one or more games of skill (or partial skill), and/or place one or more sporting event wagers.

FIG. 1 is a flowchart of an example process or method of operating the system of the present disclosure. In various embodiments, the process is represented by a set of instructions stored in one or more memories and executed by one or more processors. Although the process is described with reference to the flowchart shown in FIG. 1, many other processes of performing the acts associated with this illustrated process may be employed. For example, the order of certain of the illustrated blocks or diamonds may be changed, certain of the illustrated blocks or diamonds may be optional, or certain of the illustrated blocks or diamonds may not be employed.

In various embodiments, upon an occurrence of a non-fungible token association event, the system associates an existing non-fungible token with a gaming device as indicated in block 102 of FIG. 1. In these embodiments, if a user previously obtained a non-fungible token and wants to employ that non-fungible token in association with a gaming session at a gaming device, the user makes zero, one or more inputs and/or undertakes zero, one or more actions to link or otherwise associate that non-fungible token with the gaming device. Such an association or linkage provides that any subsequent non-fungible token event that occurs in association with that gaming session at that gaming device results in a modification of the associated non-fungible token (and not the creation of another non-fungible token). In other words, since the same event may qualify as a non-fungible token creation event (if no non-fungible token is associated with the gaming device) or a non-fungible token modification event (if a non-fungible token is associated with the gaming device), the system enables a user to associate a non-fungible token with the gaming device prior to (or, in certain instances, after) the occurrence of such an event.

In certain embodiments in which a non-fungible token is associated with a user identified via a patron management system (e.g., a player tracking account associated with a user is linked to a non-fungible token wallet associated with an existing non-fungible token), the system enables the user to log into the patron management system from the gaming device and associate an existing non-fungible token linked to that patron management system with the gaming device. In these embodiments, a user at a gaming device utilizes a mobile device application associated with the patron management system running on a mobile device and/or a physical instrument (e.g., a smart card or a user issued magnetic striped card associated with an identity of the user that the user utilizes via inserting the card into a card reader associated with the gaming device) to identify themselves to the gaming device and also identify the non-fungible token to be associated with the gaming device.

In certain embodiments in which a non-fungible token is associated with an anonymous user (or the non-fungible token is otherwise not associated with any patron management system), the system enables the user to associate an existing non-fungible token with a gaming device independent of any patron management system. In certain embodiments, a user at a gaming device utilizes the gaming device as an interface to access a non-fungible token wallet associated with an existing non-fungible token and identify the non-fungible token to be associated with the gaming device without otherwise identifying themselves to the gaming device. In certain embodiments, a user utilizes a mobile device application associated with a non-fungible token wallet associated with an existing non-fungible token running on a mobile device and/or a physical instrument (e.g., a smart card or an issued magnetic striped card that is independent of an identity of the user and that the user utilizes via inserting the card into a card reader associated with the gaming device) to identify the non-fungible token to be associated with the gaming device without otherwise identifying themselves to the gaming device.

In certain embodiments in which an association of a non-fungible token with a gaming device occurs in association with the user presenting a physical card associated with a non-fungible token wallet to the gaming device, following the presentation of the physical card, the gaming device interfaces with, such as via one or more application programming interfaces, one or more components that maintain the non-fungible token wallet. In these embodiments, following an identification of the applicable non-fungible token wallet, the gaming device displays one or more interfaces that provide access to the non-fungible token wallet and enables the user to select a non-fungible token associated with the non-fungible token wallet to associate with the gaming device.

In certain embodiments in which an association of a non-fungible token with a gaming device occurs in association with a mobile device application being executed by a mobile device, after a user has opened an application associated with the non-fungible token wallet on a mobile device and selected a non-fungible token associated with a non-fungible token wallet to associate with the gaming device, the mobile device communicates data associated with the non-fungible token to the gaming device. For example, when an association of a non-fungible token with a gaming device is attempted to be made using a mobile device application at a gaming device, the mobile device application prompts the user to cause the mobile device to engage the gaming device, such as prompting the user to tap the mobile device to a designated portion of the gaming device (or otherwise moving the mobile device to within a designated distance of a designated location of the gaming device). Such engagement initiates a pairing or linkage between the mobile device and the gaming device (or a component of a management system located inside the gaming device (i.e., a component of the gaming device)), wherein the pairing or linkage between the mobile device and the gaming device occurs via one or more applications being run or executed on the mobile device. In this example, after such engagement, the mobile device application communicates, via a wireless communication protocol (including, but not limited to: Bluetooth™, Bluetooth™ Low Energy ("BLE"), one or more cellular communication standards (e.g., 3G, 4G, 5G, 6G, LTE), one or more Wi-Fi compatible standards, and one or more short range communication protocols (e.g., a near field communication ("NFC") protocol), data to the gaming device to facilitate the potential association of a non-fungible token with the gaming device. It should be appreciated that in certain embodiments, the mobile device application utilized is a location based digital wallet enabled application, such as a Passbook-enabled or Wallet-enabled application, which is accessible when the user enters the designated location of the gaming device.

In various embodiments, to facilitate the association or linkage of an identified non-fungible token associated with the user (e.g., an anonymous user or an identified user) with the gaming device, the system determines whether or not to complete the attempted association. In these embodiments, upon receiving data or information regarding an identified non-fungible token, the gaming device (and/or a server associated with the gaming device) interfaces with, such as via one or more application programming interfaces, an external non-fungible token blockchain network (e.g., an ethereum blockchain network, etc.) associated with the identified non-fungible token to determine whether or not to associate the non-fungible token with the gaming device. In certain embodiments, to facilitate the transferring of data between an external non-fungible token blockchain network and a non-fungible token wallet associated with the user, the non-fungible token wallet creates and registers (as necessary) the respective non-fungible token account with the corresponding external non-fungible token blockchain network. Upon receiving the request and logging the user into an account associated with the user (if necessary), a component of the external non-fungible token blockchain network and/or the gaming device (or a server associated with the gaming device) determines whether to authorize the association of the non-fungible token with the gaming device. If the component of the external non-fungible token blockchain network and/or the gaming device (or a server associated with the gaming device) determines to authorize the association of the non-fungible token with the gaming device, the gaming device associates the identified non-fungible token with the gaming device. In these embodiments, the gaming device (and/or another interface) displays one or more messages regarding the association of the non-fungible token with the gaming device. On the other hand, if the component of the external non-fungible token blockchain network and/or the gaming device (or a server associated with the gaming device) determines not to authorize the association of the non-fungible token with the gaming device, the gaming device rejects the association of the identified non-fungible token with the gaming device. In these embodiments, the gaming device (and/or another interface) displays one or more denial messages and, in certain embodiments, prompts the user to attempt to select a different non-fungible token to potentially associate with the gaming device.

In certain embodiments, following any association or linkage of any non-fungible tokens with the gaming device, the system determines one or more attributes or properties of the associated non-fungible token. In certain such embodiments, if the attributes of the associated non-fungible token relate to digital content previously captured and/or created in association with a designated outcome that occurred during a play of a game, the system causes the gaming device to display such digital content. In these embodiments, since one or more awards available from plays of the gaming device include modifications to one or more attributes or properties of an existing associated non-fungible token, the system causes the gaming device to display the current attributes or properties of the non-fungible token (certain of which collectively form the digital content of the non-fungible token). For example, as seen in FIG. 2A, following the association of a non-fungible token associated with a prior win of a designated outcome in a game titled IGT Monkey Prince, the gaming device displays a visual representation of the non-fungible token. In this example, the eyes, mouth, clothing, earrings and hat represent certain of the attributes or properties of the non-fungible token which, as described below, may be modified responsive to one or more events occurring in association with the gaming device (and/or responsive to events occurring independent of the gaming device).

It should be appreciated that since different non-fungible tokens are associated with different combinations of attributes and different attributes have different scarcities, the combination of attributes of a non-fungible token and the scarcity of each respective attribute at least partially dictate the value associated with the non-fungible token. For example, if a limited amount of content utilized as non-fungible token art is provided by a third-party (e.g., an influencer or celebrity) to be used with non-fungible tokens created and/or modified by the system of the present disclosure, then based on the scarcity of that content, a non-fungible token associated with such content may have a higher value than a non-fungible token not associated with such content.

In certain embodiments, following any association or linkage of any non-fungible tokens with the gaming device, the system determines whether the associated non-fungible token is associated with any user data that warrants modifying one or more settings of the gaming device. In these embodiments, zero, one or more attributes or properties of the associated non-fungible token relate to user data which the gaming device employs to customize certain aspects of the gaming session at the gaming device, such as via customizing certain user modifiable settings of the gaming device. For example, as also seen in FIG. 2A, following the association of a non-fungible token, the gaming device determines that the non-fungible token is associated with a user preference of only displaying fruit symbols and the gaming device modifies the presentation of the symbols available to be generated to all be fruit symbols. In different embodiments, the user data stored in association with the non-fungible token includes, but is not limited to, data associated with modifying a function or magnitude of at least one setting of the gaming device (such as, but not limited to, a denomination selection setting, a wager selection setting, a payline selection setting, a volume selection setting, a speed of play setting, a theme setting, an auto-play setting, a double-up setting, a value selection setting, a multi-play game selection setting, and/or a display device setting), data associated with personalized audio/visual settings of the gaming device (e.g., data associated with a personalized symbol set to be employed by the gaming device), data associated with which games to display as available to play, data associated with previously determined favorite games, data associated with user ratings of one or more games, data associated with wagering history, data associated with gaming session history, data associated with historic wagering patterns, data associated with browsing information pertaining to the different games available (such as, but not limited to: pay table information, pay screen information, game rule information, game type information, scatter pay information, winning combination information, historical game pay statistics). It should be appreciated that any user data operable to customize or otherwise alter any aspect of the gaming session at the gaming device may be associated with the non-fungible token and thus transferrable from gaming session to gaming session as well as from gaming device to gaming device to provide that such customizations or alterations persist from gaming session to gaming session as well as from gaming device to gaming device.

In certain embodiments, if the associated non-fungible token is not associated with any user data suitable to alter one or more user settings of the gaming device, the gaming device proceeds with awaiting a game triggering event (or other action undertaken by the user) to occur. In these embodiments, if the associated non-fungible token is not used to store any user data to customize the user's gaming experience (or if the user declines an available customization based on stored user data), the gaming device proceeds to operate in a default mode. On the other hand, if the associated non-fungible token is associated with user data suitable to alter one or more settings of the gaming device, the gaming device automatically (or in certain instances, responsive to one or more inputs made by the user) updates one or more settings of the gaming device. In these embodiments, if the associated non-fungible token is used to store user data to customize the user's gaming experience, the gaming device proceeds to operate in a customized mode based on the user data stored by the associated non-fungible token. Following such alterations of one or more settings of the gaming device based on the associated non-fungible token, the gaming device proceeds with awaiting a game triggering event (or other action undertaken by the user) to occur. As such, employing the non-fungible token as an instrument to customize the settings of a gaming device enables the user's gaming session to be tailored to the user without the user having to input such alterations (or otherwise identify themselves to the gaming device).

In certain embodiments in which a user's identity remains anonymous to the system, the employment of associating user data with a non-fungible token additionally or alternatively enables the user to accrue customer loyalty benefits without otherwise having to identify themselves to a patron management system, such as a player tracking account. In these embodiments, zero, one or more attributes or properties of the associated non-fungible token relate to gaming activity data which a patron management system utilizes to provide one or more benefits to an anonymous user that owns the non-fungible token. In other words, the non-fungible token operates as a vehicle to track gaming activity of an anonymous user such that one or more benefits may be provided to the anonymous user for their loyalty. Such a configuration offers an alternative to player tracking systems for users that want to remain anonymous (i.e., not participate in being tracked by such player tracking systems) but still want the opportunities to obtain benefits in exchange for their loyalty.

In certain embodiments, following any association or linkage of any non-fungible tokens with the gaming device, the system determines whether the associated non-fungible token is associated with any feature data. In these embodiments, zero, one or more attributes or properties of the associated non-fungible token relate to feature data which can be used in association with a play of a game or saved in association with the non-fungible token (to be subsequently used as the non-fungible token is associated with other gaming device or subsequently modified, such as upgraded to a more lucrative feature). In different embodiments, the feature data relates to any suitable feature which modifies any aspect of any game played by the user, including, but are not limited to: a feature modifying one or more symbols available to be generated for a play of a game; a feature modifying one or more wild symbols available to be generated for a play of a game; a feature modifying a quantity of reels to be used for a play of a game; a feature modifying which of a plurality of reel are to be used for a play of a game; a feature modifying a deck of playing cards to be used for a play of a game; a feature modifying a quantity of playing cards to be used for a play of a game; a feature modifying a quantity of poker hands to be dealt for a play of a game; a book-end wild symbols feature; a stacked wild symbols feature; an expanding wild symbols feature; a retrigger symbol feature; an anti-terminator symbol feature; a locking reel feature, a locking symbol position feature; a modifier, such as a multiplier, feature; a feature modifying an amount of credits of a credit balance; a feature modifying an amount of promotional credits; a feature modifying a placed wager amount (e.g., a player placed a bet of $1 which is treated by the EGM as a bet of $2); a feature modifying a placed side wager amount; a feature modifying a rate of earning player tracking points; a feature modifying a rate of earning promotional credits; a feature modifying a rate of earning virtual credits; a feature modifying a number of wagered on paylines; a feature modifying a wager placed on one or more paylines (or on one or more designated paylines); a feature modifying a number of ways to win wagered on; a feature modifying a wager placed on one or more ways to win (or on one or more designated ways to win); a feature modifying an average expected payback percentage of a play of a game; a feature modifying an average expected payout of a play of a game; a feature modifying one or more awards available; a feature modifying a range of awards available; a feature modifying a type of awards available; a feature modifying one or more progressive awards; a feature modifying which progressive awards are available to be won; a feature modifying one or more modifiers, such as multipliers, available; a feature modifying an activation of a reel (or a designated reel); a feature modifying an activation of a plurality of reels; a feature modifying a generated outcome (or a designated generated outcome); a feature modifying a generated outcome (or a designated generated outcome) associated with an award over a designated value; a feature modifying a generated outcome (or a designated generated outcome) on a designated payline; a feature modifying a generated outcome (or a designated generated outcome) in a scatter configuration; a feature modifying a winning way to win (or a designated winning way to win); a feature modifying a designated symbol or symbol combination; a feature modifying a generation of a designated symbol or symbol combination on a designated payline; a feature modifying a generation of a designated symbol or symbol combination in a scatter configuration; a feature modifying a triggering event of a play of a secondary or bonus game; a feature modifying an activation of a secondary or bonus display (such as an award generator); a feature modifying a quantity of activations of a secondary or bonus display (e.g., a feature modifying a quantity of spins of an award generator); a feature modifying a quantity of sections of a secondary or bonus display (e.g., a feature modifying a quantity of sections of an award generator); a feature modifying one or more awards of a secondary or bonus display; a feature modifying an activation of a community award generator; a feature modifying a quantity of activations of a community award generator; a feature modifying a quantity of sections of a community award generator; a feature modifying one or more awards of a community award generator; a feature modifying a generated outcome (or a designated generated outcome) in a secondary game; a feature modifying a quantity of picks in a selection game (e.g., provide a player four picks in a selection game otherwise associated with 3 picks); a feature modifying a quantity of offers in an offer and acceptance game; a feature modifying a quantity of moves in a trail game; a feature modifying an amount of free spins provided; a feature modifying a game terminating or ending condition; a feature modifying an availability of a secondary game; a feature modifying a theme of a game; and/or a feature modifying any game play feature associated with any play of any game of the present disclosure.

In addition to any association of a non-fungible token with a gaming device, upon an occurrence of a game triggering event, the system initiates a play of a game as indicated in block 104 of FIG. 1. In certain embodiments, the game comprises a play of a primary game, such as a primary wagering game, wherein the game triggering event includes the placement of a wager on the play of the primary game. In certain embodiments, the game comprises a play of a secondary game, such as a free spin game, wherein the game triggering event occurs based on a displayed event associated with a play of a primary game. In certain embodiments wherein the game comprises a secondary game, such as a free spin game, the game triggering event occurs based on an event independent of any displayed event associated with the play of the primary game.

In certain embodiments, the play of the game is implemented as a game of chance (and/or a game of skill) in a networked environment, such as over the internet, in which the system enables a plurality of users, such as players, to each participate simultaneously in plays of the game using their own personal electronic device. For example, the system enables a plurality of players to access those systems via one or more web browsers running on one or more personal gaming devices to access plays of games via an online casino which employs monetary currency.

In certain embodiments, the play of the game is implemented as a casual or social game of chance (and/or a casual or social game of skill) playable via social networks or online casinos in a networked environment which employ virtual currency in the form of virtual points or credits which may not be redeemed for any monetary value (contrasted with land-based casinos which employ credits redeemable for monetary currency). In certain such embodiments, the causal or social game requires the player to place a virtual currency wager to activate the casual or social game.

In certain other embodiments, the play of the game is implemented as a game of chance (and/or a game of skill) playable in a gaming environment, such as a play of an EGM at a land-based casino, which employs currency in the form of monetary credits (which can be redeemed for monetary value). In certain such embodiments, the game of chance (and/or game of skill) requires the player to place a monetary wager to activate the game of chance.

It should be appreciated that when the game is implemented as a game of skill, the system enables a player to make one or more quantifiable skill inputs to manipulate, influence or otherwise control one or more aspects of the game of skill (and thus influence or otherwise affect the outcome of the game of skill). In these embodiments, a player's skill is determined and quantified by one or more inputs (or the lack of any inputs) by the player that tend to measure one or more aspects of the player's skill. For example, skill includes utilizing one or more skill input devices to exhibit: (i) physical skill, such as, but not limited to: timing, aim, physical strength or any combination thereof which is quantifiable by zero, one or more inputs made by the player in association with the game of skill; (ii) mental skill (i.e., knowledge, reasoning, and/or strategy) which is quantifiable by one or more inputs made by the player (or the lack of any inputs made by the player) in association with the game of skill; and (iii) any other type of skill which is quantifiable by one or more inputs made by the player (or the lack of any inputs made by the player) in association with the game of skill. Such skill input devices include, but are not limited to: joysticks, buttons, a mouse or a plurality of mice, one or more trackballs, one or more pointing devices, a personal gaming device, such as a mobile device, one or more bodily motion trackers such as motion sensing devices for human-computer interaction, touchpads, touchscreens, one or more controllers with: (1) one or more motion sensing devices, (2) one or more proximity sensing devices, (3) one or more force sensing devices (transducers), (4) one or more accelerometers, or any other suitable skill input devices.

Following the initiation of the play of the game, for the play of the game, the system determines and displays a game outcome as indicated in block 106 of FIG. 1. In certain embodiments wherein the game is a game of chance, the system determines the game outcome based on one or more random determinations. For example, as seen in FIGS. 2B and 2C, if the initiated game is a reel game, the system spins a plurality of reels 202a to 202e (as seen in FIG. 2B) to display a plurality of symbols 204a to 204o at a plurality of symbol display positions 206a to 206o (as seen in FIG. 2C). In this example, since the user data associated with the non-fungible token included user preference data that only fruit symbols be displayed for the play of the game, the play of the game employed a modified symbol set of only fruit symbols (e.g., certain non-fruit symbols were replaced with fruit symbols without altering the probability of such symbols (now displayable as fruit symbols) being randomly determined). In certain embodiments wherein the game is a game of skill, the system determines the game outcomes based on zero, one or more skill-based inputs made (or not made) in association with the play of the game of skill.

It should be appreciated that while illustrated as a play of a slot game, the system of the present disclosure may operate in association with any play of any suitable game including, but not limited to: a play of any suitable slot game; a play of any suitable wheel game; a play of any suitable table game (whether played at a gaming table or from a gaming device remote from the gaming table) including, but not limited to: a play of any suitable card game, such as but not limited to any suitable poker game (including, but not limited to, Texas Hold'em, Omaha, Three Card Poker, Four Card Poker, Seven Card Stud, Pai Gow Poker, Caribbean Stud Poker, Let It Ride Poker), any suitable blackjack game, any suitable Baccarat game, any suitable Spanish 21 game, any suitable Casino War game, any suitable Super Fun 21 game, and any suitable Vegas Three Card Rummy game, a play of any suitable craps game, and/or a play of any suitable roulette game; a play of any suitable offer and acceptance game; a play of any suitable award ladder game; a play of any suitable puzzle-type game; a play of any suitable persistence game; a play of any suitable selection game; a play of any suitable cascading symbols game; a play of any suitable ways to win game; a play of any suitable scatter pay game; a play of any suitable coin-pusher game; a play of any suitable elimination game; a play of any suitable trail game; a play of any suitable bingo game; a play of any suitable video scratch-off game; a play of any suitable pick-until-complete game; a play of any suitable shooting simulation game; a play of any suitable racing game; a play of any suitable promotional game; a play of any suitable high-low game; a play of any suitable lottery game; a play of any suitable number selection game; a play of any suitable dice game; a play of any suitable skill game; a play of any suitable auction game; a play of any suitable reverse-auction game; a play of any suitable group game; a play of any suitable game in a service window; a play of any suitable game on a mobile device; and/or a play of any suitable game of the present disclosure.

In addition to determining and displaying a game outcome, the system determines if the determined game outcome is associated with a non-fungible token event as indicated by diamond 108 of FIG. 1. In these embodiments, since one or more events associated with the play of the game may result in the creation and/or modification of a non-fungible token commemorating such events, the system determines whether any of such events occurred in association with the play of the game that qualify to cause such a non-fungible token to be created and/or modified.

It should be appreciated that while illustrated as a non-fungible token event occurring in association with the determination of an outcome of a play of a game, the non-fungible token event may occur in association with any aspect of the user's interaction with the gaming device, such as, not limited to, any aspects of the user's gaming experience at a gaming establishment, any aspects of the user's gaming experience remote from the gaming establishment, any aspect of the user's non-gaming experience at a gaming establishment, and/or any aspect of the user's non-gaming experience remote from the gaming establishment. That is, the non-fungible token event may occur in association with any aspect of any game of chance, any game of skill, any lottery game, or any sporting event wagering activity or may occur independent of any aspect of any game of chance, any game of skill, any lottery game or any sporting event wagering activity. It should be further appreciated that while described in association with non-fungible token occurring based on a player's interaction with a gaming device, in different embodiments, the non-fungible token event occurs in association with a user's interaction with any suitable gaming component, such as a sports betting kiosk, a gaming table, and/or a gaming terminal associated with a gaming table.

In certain embodiments, in addition to (or alternative from) the non-fungible token event occurring based on a determination of an outcome of a play of a game, a non-fungible token event occurs in association with one or more tracked events (such as one or more events tracked by a patron management system and stored by the patron management system or stored in association with the non-fungible token). In these embodiments, upon one or more tracked events occurring in association with a tracked user (such as a tracked identified user or a tracked anonymous user), the system causes a non-fungible token event to occur. For example, when a patron management system determines that, based on a user's spend at a gaming establishment, the user has transitioned from one status level to a higher status level, in recognition of the achievement, the patron management system causes a non-fungible token event to occur.

In certain embodiments, the non-fungible token event occurs based on any event or series of events associated with the user's gaming experience, such as one or more plays of any game of chance, one or more plays of any game of skill, one or more plays of a lottery game or one or more sporting event wagers placed. In these embodiments, a non-fungible token event occurs in association with an achievement reached by the user, such as obtaining certain awards or completing certain gaming activities associated with one or more gaming establishments. In different embodiments, such events include, but are not limited to: the presentation of any outcome, the presentation of a designated outcome, the presentation of a sequence of outcomes, the presentation of any award, the presentation of a designated award, the presentation of an award over a threshold value, the presentation of a sequence of awards, the placement of a sporting event wager, the placement of a sporting event wager over a threshold value, winning a placed sporting event wager, winning a placed sporting event wager over a threshold value, the presentation of a qualifying losing outcome (e.g., the presentation of nearly hitting a progressive award but being off by one symbol), the triggering of a bonus game, the activation of a feature of a game, the accumulation of a quantity of one or more collectible elements, the cashing out of a quantity of player points, the deposit of funds to play one or more games, the cashing out of winnings from one or more game, and/or a detection of a player's biometric data, such as a player's monitored heartrate or captured facial expression, being associated with a triggering event which occurs during a play of a game.

In certain embodiments, the non-fungible token event occurs based on any event or series of events associated with the user's non-gaming experience. In these embodiments, a non-fungible token event occurs in association with an achievement reached by the user, such as completing certain non-gaming activities associated with one or more gaming establishments. In different embodiments, such non-fungible token events include, but are not limited to: a redemption of a quantity of player tracking points, a user making one or more purchases at one or more retail locations of a gaming establishment, a user making one or more designated purchases at one or more retail locations of a gaming establishment, a user attending one or more events at a gaming establishment, a user utilizing one or more gaming establishment services, a user attending a club and/or show associated with a gaming establishment, a user taking a picture associated with the gaming establishment, a user observing one or more other people, such as a user taking a picture of a celebrity or a uniquely dressed person at a gaming establishment, and/or a user observing the activity of other people, such as a user taking a picture of another patron winning a progressive award.

In certain embodiments, certain instances of an occurrence of an event are associated with a non-fungible token event while other instances of the occurrence of the event are not associated with a non-fungible token event. In these embodiments, non-fungible token events occur in association with a first certain number of users whom participate in an event, participations in the event, and/or triggerings of an award or game outcome from the event, wherein after that first certain number, subsequences occurrences do not cause a non-fungible token event to occur. For example, a non-fungible token event occurs in association with the first ten players whom trigger a bonus game while no non-fungible token event occurs in association with the eleventh player to trigger the bonus game. In another example, a non-fungible token event occurs in association with the first two instances of a royal flush associated with a progressive award being hit while no non-fungible token event occurs in association the third royal flush associated with the progressive award being hit. In another example, a non-fungible token event occurs in association with an event occurring during a defined period of time, such as within two-hours of midnight on December $31^{st}$ (i.e., the last few hours of a year) or on opening night of a gaming establishment, wherein the same event occurring outside the defined period of time does not result in the occurrence of a non-fungible token event. In certain embodiments, each instance of an occurrence of an event is associated with a non-fungible token event. For example, a non-fungible token event occurs in association with each time a player wins a mystery progressive award (e.g., a progressive award that is triggered independent of any displayed outcome of any game, such as a lucky coin or lucky time progressive award) valued at or above a threshold level.

In certain embodiments wherein the non-fungible token is created and/or modified in association with the user's gaming experience and/or non-gaming experience, the system utilizes one or more devices to generate content associated with the non-fungible token. For example, when a user, such as a player, participates in a new activity at a gaming establishment (i.e., the occurrence of the non-fungible token event), the user selects one or more images of themselves participating in the new activity. In this example, the system utilizes the selected content components (plus, in certain instances, the content component of a logo associated with the gaming establishment) to create and/or modify the non-fungible token. In another example, when a user purchases a good from a retail location, a retail point-of-sale terminal selects one or more content components of one or more images of the purchased good, a sale price associated with the purchased good and a logo of the gaming establishment where the purchased occurred. In this example, the retail point-of-sale terminal associated with the gaming establishment utilizes the selected content components to create and/or modify the non-fungible token. In another example, when a third-party contributor provides content to be used as an attribute of a non-fungible token, the system operates with one or more devices associated with the third-party contributor to access the content provided by the third-party contributor.

In certain embodiments, the non-fungible token event occurs based on one or more inputs made by the user that are received by the gaming device. In these embodiments, if the non-fungible token operates as a storage vehicle for user data, such as user preference data, and the user makes one or more inputs to modify such user preferences, the non-fungible token event occurs and such modified user preferences become one or more attributes or properties of a created and/or modified non-fungible token. For example, if a user makes one or more inputs to change the speed of play of the gaming device, such changes qualify as an occurrence of a non-fungible token event and the system operates to ensure that such changes are memorialized as an attribute of a created and/or modified non-fungible token. In certain embodiments in which the non-fungible token operates as a storage vehicle for user data, the non-fungible token event occurs independent of any inputs made by the user. In these embodiments, to memorialize tracked data associated with the user, a non-fungible token event occurs and such tracked data become one or more attributes or properties of a created and/or modified non-fungible token. For example, at the conclusion of a gaming session, to track an anonymous user's wagering activity (for, amongst other reasons, loyalty award determination purposes), the system causes a non-fungible token event to occur to ensure that such traced wagering activity is stored as an attribute of a created and/or modified non-fungible token.

Returning to FIG. 1, if the system determines that a non-fungible token event did not occur in association with the determined game outcome, as indicated in block 110, the system does not create and/or modify any non-fungible tokens in association with the initiated play of the game. In certain embodiments, following a determination not to create and/or modify any non-fungible tokens in association with an instance of the play of the game offered by the system, the system awaits another occurrence of a game triggering event. In these embodiments, if the system determines that no aspect of the play of the game warranted the creation and/or modification of a non-fungible token to memorialize that aspect of the play of the game, the system awaits for another play of the game and another opportunity to create and/or modify a non-fungible token in association with another aspect of another play of another game.

On the other hand, if the system determines that the determined game outcome is associated with a non-fungible token event, then as indicated in block 112, the system determines if the gaming device is currently associated with an existing non-fungible token. Such a determination drives whether a new non-fungible token will be created responsive to the event occurring or a modification to an existing non-fungible token will occur responsive to the event occurring. In other words, if the gaming device is not associated with a non-fungible token and a non-fungible token event occurs, then the non-fungible token event qualifies as a non-fungible token creation event. However, if the gaming device is associated with a non-fungible token and a non-fungible modification event occurs, then the non-fungible token event qualifies as a non-fungible token creation event.

In certain embodiments, if the system determines that the gaming device is not associated with any non-fungible tokens and a non-fungible token event occurs in association with the determined game outcome, as indicated in block 114 of FIG. 1, the system creates, in a blockchain (or operates with a non-fungible token service to create, in a blockchain) a non-fungible token as the award associated with the determined game outcome. That is, in addition to (or in lieu of) providing any monetary or non-monetary award associated with a determined game outcome, the system causes a creation of a non-fungible token in association with the determined game award.

In various embodiments, the non-fungible token created as the award includes digital content generated in association with the user's gaming experience, digital content generated in association with a user's non-gaming experience, and/or user generated digital content (e.g., digital content generated by the user and/or content saved in association with the user's gaming establishment account). Certain of the attributes or properties of one or more of these different sources of digital content collectively form the non-fungible token.

In these embodiments, the non-fungible token includes one or more digital content components in one or more media formats. In such embodiments, the digital content components includes one or more of: still images (e.g., a screen capture of an outcome of a play of a game), video clips (e.g., a video recording of a play of a game or a video clip the user previously uploaded), sound clips (e.g., a user's verbal reaction to a play of a game), audio-video clips, text (e.g., a meme the user previously uploaded), social media site information (e.g. a uniform resource locator of a social media site), transaction information (e.g., a wager amount), location information, application usage information, non-fungible token service information and statistics, and/or biometric information.

In certain embodiments, the digital content components are combinable with contextual information, such as information about the person, place and time, and then formatted to assist in the creation of the non-fungible token. For example, if a user obtains a royal flush outcome during a play of a poker game and the system determines that the occurrence of this royal flush outcome warrants the creation of a non-fungible token, in the creation of the non-fungible token, the system utilizes a screen capture or video of the user hitting the royal flush outcome (taken from the EGM screen and/or using surveillance video around the EGM), wherein the video or images are overlaid with other details of the event, such as the wager amount placed, the game theme, the user name, gaming establishment name, the gaming establishment address, and/or the date/time when the royal flush outcome was obtained.

In certain embodiments, the system enables the user (and/or the system operator) to select one or more characteristics or parameters of the non-fungible token they prefer, such as the type of information (e.g., whether or not to include an image of the user) associated with the non-fungible token. In one such embodiment, the system enables a user to associate their gaming establishment account, such as a player tracking account or a cashless wagering account, with the distribution of a non-fungible token wherein upon a determination to create and distribute (and/or modify) a non-fungible token as an award, the system utilizes the user's gaming establishment account. In another such embodiment, the system enables a user to associate one or more non-fungible token services with their gaming establishment account, such as a player tracking account or a cashless wagering account, wherein upon a determination to create and distribute and/or modify a non-fungible token as an award, the system communicates with the non-fungible token service to determine the non-fungible token to be created and distributed (and/or modified) as the award. For example, the system enables a user to utilize a gaming establishment mobile device application and/or a gaming device interface to enter one or more uniform resource locators ("URLs") of one or more of non-fungible token services which the user maintains an account that stores one or more non-fungible tokens. In this example, upon a determination to create and distribute (and/or modify) a non-fungible token as an award, the system utilizes such URLs to distribute a created non-fungible token and/or modify an existing non-fungible token to the maintained account.

Figure 3:
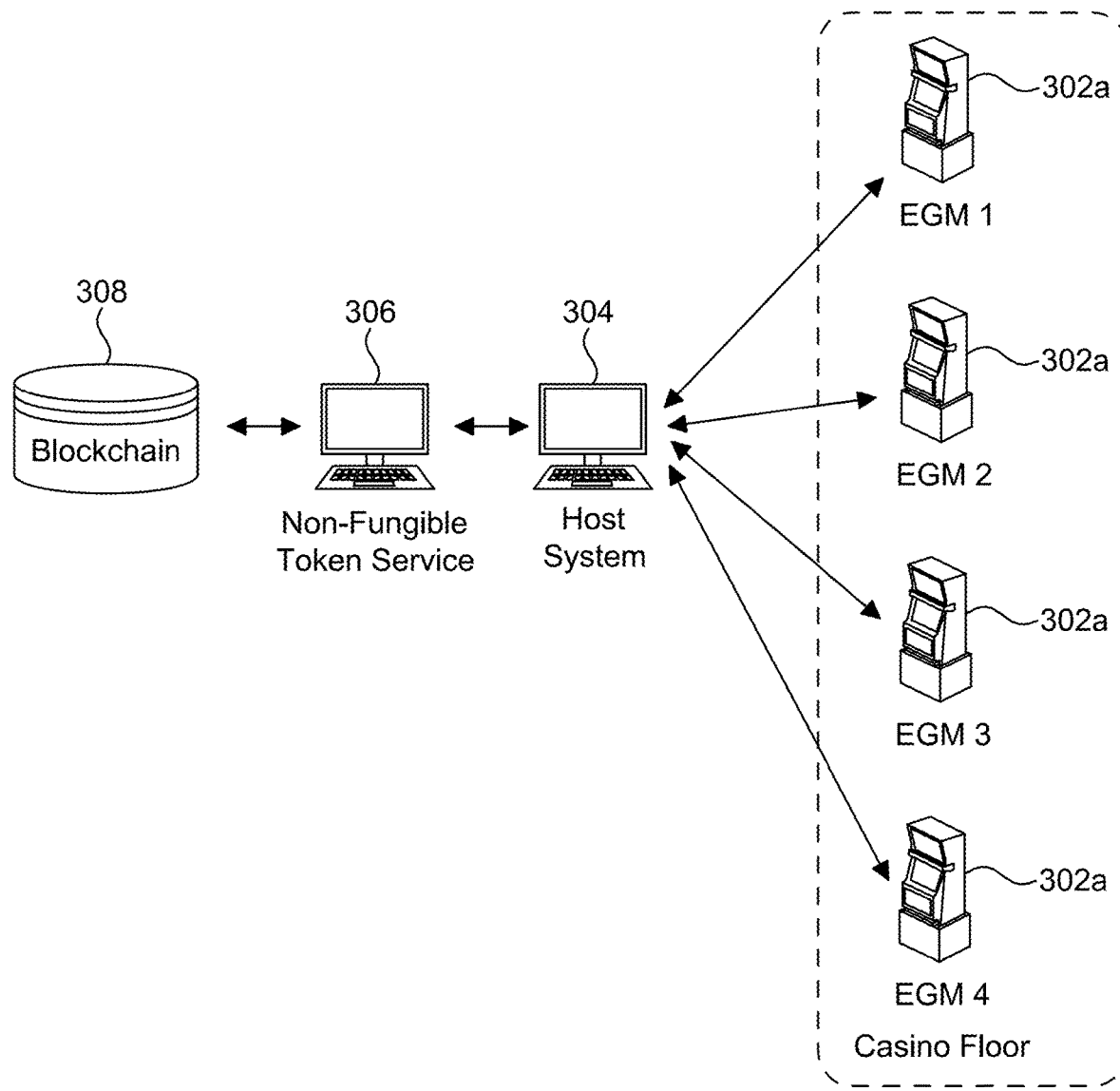
FIG. 3 is an example configuration of the architecture of a plurality of different components of the system of the present disclosure.

In certain embodiments, as seen in FIG. 3, following an occurrence of a non-fungible token creation event, a gaming device, such as an EGM 302, communicates a request for a non-fungible token to a host system 304. The request includes part or all of the digital content associated with the non-fungible token to be created. In certain embodiments, upon receiving and verifying the request for the creation of a non-fungible token associated with the identified digital content, the host system communicates the request for the creation of a non-fungible token associated with the identified digital content to an online non-fungible token service 306 (e.g., an OpenSea system) which then operates to create a unique non-fungible token in a blockchain 308. In certain other embodiments (not shown), upon receiving and verifying the request for the creation of a non-fungible token associated with the identified digital content, the host system operates to create a unique non-fungible token in a blockchain independent of any online non-fungible token service. As such, in certain embodiments, to create a non-fungible token, the system (e.g., a server in communication with the gaming device that generated the game outcome that resulted in the creation of the non-fungible token) communicates with a blockchain to create the non-fungible token in the blockchain while in certain other embodiments, to create a non-fungible token, the system (e.g., a server in communication with the gaming device that generated the game outcome that resulted in the creation of the non-fungible token) communicates with a non-fungible token service to create the non-fungible token in the blockchain.

In certain embodiments, if the system determines that the gaming device is associated with an existing non-fungible token and a non-fungible token event occurs in association with the determined game outcome, as indicated in block 116 of FIG. 1, the system modifies, in a blockchain (or operates with a non-fungible token service to create, in a blockchain) the associated non-fungible token as the award associated with the determined game outcome. That is, in addition to (or in lieu of) providing any monetary or non-monetary award associated with a determined game outcome, the system causes a modification of a non-fungible token in association with the determined game award. For example, as seen in FIG. 2C, upon determining that the displayed symbol combination is associated with a non-fungible token event and the non-fungible token event qualifies as a non-fungible token modification event, the system causes a modification of the existing non-fungible token by modifying the clothing attribute of the non-fungible token from no clothing to a shirt that is only associated with 2% of similar non-fungible tokens.

In various embodiments, the non-fungible token modified as the award includes a modification of the digital content of the associated non-fungible token with digital content generated in association with the user's gaming experience, digital content generated in association with a user's non-gaming experience, and/or user generated digital content (e.g., digital content generated by the player and/or content saved in association with the player's gaming establishment account). In these embodiments, the existing attributes or properties of the non-fungible token are modified with or otherwise replaced with one or more created attributes or properties of one or more of these different sources of digital content to collectively form a modified non-fungible token. As such, if a non-fungible token is associated with a gaming device and one or more events occur in association with the gaming device, the system modifies the non-fungible token, such as by creating one or more non-fungible token attributes or properties and utilizing those created non-fungible token attributes or properties to replace one or more of attributes or properties of the existing non-fungible token.

In certain embodiments, following an occurrence of a non-fungible token modification event, the gaming device communicates a request for a modification of the associated non-fungible token to a host system. The request includes part or all of the digital content associated with the non-fungible token to be modified. In certain such embodiments, the request includes one or more created non-fungible token attributes or properties communicated to the host system for the host system to employ in modifying the associated non-fungible token. In certain embodiments, upon receiving and verifying the request for the modification of a non-fungible token associated with the identified digital content, the host system communicates the request for the modification of a non-fungible token associated with the identified digital content to an online non-fungible token service (e.g., an OpenSea system) which then operates to modify, in a blockchain, the unique non-fungible token associated with the gaming device. In certain other embodiments, upon receiving and verifying the request for the modification of a non-fungible token associated with the identified digital content, the host system operates to modify, in a blockchain independent of any online non-fungible token service, the unique non-fungible token associated with the gaming device. As such, in certain embodiments, to modify a non-fungible token, the system (e.g., a server in communication with the gaming device that generated the game outcome that resulted in the generation of the non-fungible token) communicates with a blockchain to modify the associated non-fungible token in the blockchain while in certain other embodiments, to modify a non-fungible token, the system (e.g., a server in communication with the gaming device that generated the game outcome that resulted in the modification of the non-fungible token) communicates with a non-fungible token service to modify the associated non-fungible token in the blockchain.

It should be appreciated that depending on the configuration of the host system, the non-fungible token server and/or the blockchain, the modification of one or more attributes of a non-fungible token may include updating the data associated with that non-fungible token to reflect the modified attribute or retiring that non-fungible token and replacing the retired non-fungible token with a new non-fungible token that retains certain unmodified attributes and the modified attributes. It should be further appreciated that one or more non-fungible tokens of the present disclosure may be implemented in accordance with any suitable distributed ledger technology. Such distributed ledger technology which the non-fungible tokens of the present disclosure may be associated with includes any suitable distributed ledger that enables recording and sharing of information across multiple data stores wherein each of the data stores (i.e., ledgers) includes the same data records, subject to maintenance and control through a distributed network of computing nodes. In different embodiments, such distributed ledger technology includes, but is not limited to, blockchain, directed acyclic graph, hashgraph, holochain, tempo (Radix), and any variation of these distributed ledger technologies in permissioned and/or permissionless form.

In certain embodiments wherein the employed distributed ledger technology utilizes blockchain technology, one or more non-fungible tokens are implemented in a blockchain, such as Ethereum. In these embodiments, the non-fungible token is either stored directly in the blockchain (e.g., using a smart contract that follows the ERC-721 standard) or a reference to the non-fungible token (e.g., a URL to the non-fungible token) is stored in the blockchain. In certain embodiments, various information associated with the created non-fungible token is indicated in the blockchain. In certain such embodiments, the information stored in the blockchain includes the owner of the non-fungible token, a URL associated with the non-fungible token, a history of the non-fungible token, the digital content associated with the non-fungible token, and/or data associated with the non-fungible token (e.g., the date and time of an event the non-fungible token represents). In other such embodiments, the information stored in the blockchain additionally (or alternatively) includes a state of the non-fungible token. In one such embodiment, the state of the non-fungible token relates to a redemption state wherein when the non-fungible token is first created, the non-fungible token is not redeemed, but later the state changes to redeemed after the owner of the non-fungible token invokes a behavior associated with the non-fungible token.

In certain embodiments wherein the employed distributed ledger technology differs from blockchain technology, one or more non-fungible tokens are implemented in accordance with a directed acyclic graph protocol (which provides potentially higher throughput of transactions, and fee-less transactions). In these embodiments, the directed acyclic graph protocol enables the storing of the non-fungible token or a reference to the non-fungible token but without the utilization of blocks. Specifically, the directed acyclic graph of this embodiment employs a finite directed graph that includes an infinite amount of edges and vertices, wherein each edge is directed from one vertex to another without having to start at any one particular vertex or follow a consistent or directed sequence of edges to loop back to the same vertex again.

In various embodiments, the created and/or modified non-fungible token is a unique cryptographic entry or asset that is associated with digital content. That is, the created and/or modified non-fungible token serves as proof of an occurrence of event wherein if the user (after being assigned ownership of the non-fungible token) wanted to share digital content associated with the occurrence of the event, such as via a social media posting, the user could share the digital content associated with the non-fungible token.

It should be appreciated that while illustrated as a play of a slot game, the system of the present disclosure may cause the creation of a non-fungible token and/or modification of a non-fungible token in association with any suitable live sporting event, historic sporting event (e.g., a prerecorded sporting event), recreated sporting event (e.g., an animated representation of a historic sporting event), simulated sporting event (e.g., a sporting event created from different parts of different historical sporting events wherein zero, one or more results of such a simulated sporting event are randomly determined) and/or electronic sporting event (e.g., a virtual or electronic sport event played by humans, by computer driven participants or by a mix of human and computer driven participants) of any suitable sport at any professional and/or amateur level including, but not limited to, football, basketball, baseball, boxing, horse racing, wrestling, mixed martial arts, golf, cricket, soccer, hockey, field hockey, tennis, volleyball, table tennis, rugby, swimming, diving, archery, cycling, billiards, fishing, gymnastics, hunting, track and field, sailing, and/or car racing. In these embodiments, since one or more events associated with a wagered on sporting event may result in the creation and/or modification of a non-fungible token, the system determines whether any of such events occurred that qualify to cause such a non-fungible token to be created and/or modified In certain embodiments, in addition to the creation and/or modification of any non-fungible tokens associated with the play of the game, the system determines and displays any award associated with the determined game outcome which is independent of any non-fungible tokens. In these embodiments, separate from a determination that zero, one or more non-fungible token will or will not be created and/or modified in association with the determined game outcome, the system determines and displays any award associated with the determined game outcome. In different embodiments, such an award includes any suitable award, such as a quantity of monetary credits, a quantity of non-monetary credits, a quantity of promotional credits, a quantity of player tracking points, a progressive award, a modifier, such as a multiplier, a quantity of free plays of one or more games, a quantity of plays of one or more secondary or bonus games, a multiplier of a quantity of free plays of a game, one or more lottery based awards, such as lottery or drawing tickets, a wager match for one or more plays of one or more games, an increase in the average expected payback percentage for one or more plays of one or more games, one or more comps, such as a free meal at a buffet, a free night's stay at a hotel, an upgrade for a stay at a hotel, tickets to a show, a high value product such as a car, or a low value product, one or more bonus credits usable for online play, a lump sum of player tracking points or credits, a multiplier for player tracking points or credits, an increase in a membership or player tracking level, one or more coupons or promotions usable within and/or outside of the gaming establishment, virtual goods associated with one or more gaming establishment components, and/or virtual goods not associated with any gaming establishment components.

In addition to operating as a digital representation of an occurrence of an event and/or the digital representative of user data which exists independent of any patron management system, the system employs blockchain technology to manage the ownership of a created non-fungible token and/or a created non-fungible token attribute (usable to modify an existing non-fungible token). Specifically, the created non-fungible token and/or the created non-fungible token attribute (usable to modify an existing non-fungible token) is built upon public-key cryptography that utilizes pairs of keys: public keys (which are publicly known and essential for identification) and private keys (which are kept secret and are used for authentication and encryption). In operation, upon the creation of a non-fungible token and/or the creation of a non-fungible token attribute, a private key of the host system is used to assign the created non-fungible token and/or the created non-fungible token attribute (usable to modify an existing non-fungible token) to an address associated with the host system. Put differently, the owner of the non-fungible token, the non-fungible token attribute (or other blockchain asset) possess a private key, wherein by using the key to encrypt or decrypt certain information, third-parties can verify that the correct private key was used and therefore the entity encrypting with the private key is the valid owner. Accordingly, via the use of a public key to verify information was signed with the matching private key, any party can verify that the host system is the owner of the created non-fungible token and/or the created non-fungible token attribute (usable to modify an existing non-fungible token) and thus has the authority to transfer the created non-fungible token and/or the created non-fungible token attribute upon an occurrence of a distribution event.

In certain embodiments, following the creation of a non-fungible token and/or a non-fungible token attribute (to modify an associated non-fungible token) in the blockchain, the system determines if a non-fungible token distribution event occurred. In certain such embodiments, a non-fungible token distribution event occurs in association with (or otherwise as part of) a non-fungible token event. In these embodiments, an occurrence of a non-fungible token event automatically triggers a non-fungible token distribution event upon the creation and/or modification of the non-fungible token. In certain embodiments, a non-fungible token distribution event occurs independent of a non-fungible token event. In these embodiments, a non-fungible token is created and/or modified upon an occurrence of a non-fungible token event, but the non-fungible token and/or non-fungible token attribute is not assigned ownership to a particular user until one or more conditions are subsequently satisfied (which cause the non-fungible token distribution event to occur).

If the system determines that a non-fungible token distribution event did not occur, the system continues to periodically monitor for an occurrence of a non-fungible token distribution event. In other words, while, in certain embodiments, ownership of a created and/or modified non-fungible token may temporarily remain, in the blockchain, with the host system, in an effort to transfer ownership, in the blockchain, from the host system to a crypto wallet associated with a user, the system periodically redetermines whether a non-fungible token distribution event occurs.

On the other hand, if the system determines that a non-fungible token distribution event occurred, the system causes a transfer of the non-fungible token and/or the non-fungible token attribute to occur in the blockchain. That is, upon an occurrence of a non-fungible token distribution event, the host system operates to transfer the non-fungible token and/or the non-fungible token attribute from being owned, in the blockchain, by the host system to being owned, in the blockchain, by a crypto wallet associated with the user.

In certain embodiments, upon an occurrence a non-fungible token distribution event, the system utilizes one or more components of a gaming establishment non-fungible token management system to transfer, in the blockchain, the created and/or modified non-fungible token to an address associated with the user. In these embodiments, the system includes (or is otherwise associated with) a gaming establishment non-fungible token management system that maintains a gaming establishment non-fungible token management account associated with a crypto wallet. The crypto wallet contains one or more crypto keys of the user wherein following the host system creating or modifying (or causing the creation or modification of) a non-fungible token, the system transfers the non-fungible token from being owned by a key associated with the host system to a key associated with the user that is held in a crypto wallet associated with the gaming establishment non-fungible token management system account maintained for the user. For example, following the establishment of a wireless connection between a gaming device and a mobile device application associated with a gaming establishment non-fungible token management system account maintained for the user, the user utilizes the mobile device application to inform the gaming establishment non-fungible token management system of the crypto wallet address to transfer the non-fungible token to. In another example, following the establishment of a wireless connection between a gaming device and a mobile device application associated with a gaming establishment non-fungible token management system account, the gaming device communicates data to the mobile device which takes the user to a non-fungible token website (or launches a non-fungible token mobile device application) where the user enters their crypto wallet address and information to transfer the non-fungible token to the user's ownership.

In certain other embodiments wherein a created and/or modified non-fungible token is associated with a key of the host system, the system requires the user to validate their identity online with the host system. In certain instances, this validation could include the user logging into a gaming establishment mobile application (or a gaming establishment website) and correctly entering information associated with an account (e.g., correctly entering an assigned user identification, a personal identification number, an email address, and/or a password) and/or validating that they own an associated email address and/or mobile phone number. In these embodiments, once the user's identity has been validated, the user could then enter a wallet address on the blockchain to transfer the non-fungible token to.

In certain embodiments, upon an occurrence a non-fungible token distribution event, the system utilizes one or more components of a patron management system to transfer, in the blockchain, the created and/or modified non-fungible token to an address associated with the user. In these embodiments, the system includes (or is otherwise associated with) a patron management system that maintains a patron management account, such as a player tracking account, associated with a crypto wallet. The crypto wallet contains one or more crypto keys of the user wherein following the host system creating or modifying (or causing the creation or modification of) a non-fungible token, the system transfers the non-fungible token from being owned by a key associated with the host system to a key associated with the user that is held in a crypto wallet associated with the patron management system account maintained for the user. For example, following the establishment of a wireless connection between a gaming device and a mobile device application associated with a player tracking account, the user utilizes the mobile device application to inform the player tracking system of the crypto wallet address to transfer the non-fungible token to. In another example, following the establishment of a wireless connection between a gaming device and a mobile device application associated with a player tracking account, the gaming device communicates data to the mobile device which takes the user to a non-fungible token website (or launches a non-fungible token mobile device application) where the user enters their crypto wallet address and information to transfer the non-fungible token to the user's ownership.

In certain embodiments, upon an occurrence a non-fungible token distribution event, the system utilizes one or more machine-readable codes to facilitate the transfer, in the blockchain, of the created and/or modified non-fungible token to an address associated with the user. In these embodiments, once a user's identity has been validated (via the use of a mobile device application and/or a physical instrument, such as a player tracking card, associated with the user), the host system utilizes one or more machine readable codes, such as a QR code, as the non-fungible token delivery mechanism. For example, a gaming device displays a QR code that, when scanned by the user using a mobile device, takes the user to a non-fungible token website (or launches a non-fungible token mobile device application and/or a gaming establishment mobile device application) where the user enters their crypto wallet address and information to transfer the non-fungible token to the user's ownership. In another example, the gaming device produces a ticket that, when scanned by a user using a mobile device or kiosk, takes the user to a non-fungible token website (or launches a non-fungible token mobile device application and/or a gaming establishment mobile device application) where the user enters their crypto wallet address and information to transfer the non-fungible token to the user's ownership.

It should be appreciated that while described as employing non-fungible tokens which are each unique and individually owned by a single party, in different embodiments, the system employs semi-fungible tokens wherein each unique semi-fungible token is collectively owned, in the blockchain, by multiple parties. In these embodiments, once created, the semi-fungible token may be transferred, in the blockchain, from an address associated with the host system to multiple addresses associated with multiple users. In one such embodiment, each individual owner owns, in the blockchain, an identifiable portion of the semi-fungible token. In another such embodiment, each individual owner owns, in the blockchain, an undivided share of the semi-fungible token.

In certain embodiments, in addition to creating and/or modifying one or more non-fungible tokens in association with a user's gaming experience (and/or non-gaming experience), the system facilitates a marketplace in which non-fungible tokens (and/or individual non-fungible token attributes) may be bought, sold, offered for sale, bid on and/or traded amongst different users. In these embodiments, since different non-fungible tokens are associated with different combinations of attributes and different attributes have different scarcities, the combination of attributes of each non-fungible token and the scarcity of each respective attribute dictate the value which the marketplaces places on such non-fungible tokens. That is, at least the scarcity of the individual attributes of the non-fungible token (which is provided by the blockchain technology in the form of how many/a percentage of non-fungible tokens share the same individual attribute), the reputation of the author/issuer of the non-fungible token as well as the liquidity of the non-fungible token (e.g., are there buyers/sellers of the non-fungible token and/or the individual attributes of the non-fungible token) drive the marketplace value of the non-fungible token. Accordingly, since the different attributes of a non-fungible token, such as the different components of the artwork of the non-fungible token, have a marketplace value that fluctuates, the marketplace value of the non-fungible token also fluctuates and certain users may want to capitalize on these fluctuations by interfacing with the system of the present disclosure to facilitate the buying and/or selling such non-fungible tokens. It should be appreciated that any transaction facilitated by the marketplace are written in a blockchain ledger as described above in association with how non-fungible tokens created and/or modified in association with a user's gaming (or non-gaming) experience are written in a blockchain ledger. It should be further appreciated that in different embodiments, the system utilizes a mobile device running a mobile device application, a kiosk, a web browser, a gaming device, a service window displayed by a gaming device (e.g., a remote host controlled service window displayed by an EGM), a component of a gaming establishment patron management system, such as a player tracking unit, and/or a gaming establishment interface to interface with the non-fungible token marketplace.

In certain such embodiments, the system enables a user to participate in marketplace transactions involving complete non-fungible tokens in which the non-fungible token is sold by one user (such that an account associated with that user is increased accordingly) and bought by another user (such that an account associated with that user is decreased accordingly). In these embodiments, following a user obtaining a non-fungible token (with an initial set of non-fungible token attributes) and potentially following the user modifying, over time, one or more of the initial set of non-fungible token attributes with different attributes, the system enables the user to sell the non-fungible token for an amount of currency. For example, following the user upgrading the non-fungible token of FIG. 2C with the addition of digital content represented as a shirt, the user accesses, via the gaming device, an interface of the marketplace and posts an auction listing for the non-fungible token. Such a configuration introduces an element of liquidity to the non-fungible tokens created and/or modified by enabling the user to exchange an asset in the digital domain (i.e., the non-fungible token) for an asset outside of the digital domain (i.e., the currency received).

In certain such embodiments, the system enables a user to participate in marketplace transactions involving complete non-fungible tokens in which non-fungible tokens are traded from one user to another user. In these embodiments, following multiple users each obtaining a non-fungible token (with different initial sets of non-fungible token attributes) and potentially following one or more of these multiple users each modifying, over time, one or more of the respective initial sets of non-fungible token attributes with different attributes, the system enables the users to trade their non-fungible tokens. Such a configuration introduces an element of liquidity to the non-fungible tokens created and/or modified by enabling the user to exchange an asset in the digital domain (i.e., the user's current non-fungible token) for another asset in the digital domain (i.e., another user's current non-fungible token).

In certain other embodiments, in addition to or alternative from transacting with complete non-fungible tokens, the system enables a user to participate in marketplace transactions involving partial non-fungible tokens in which one or more attributes of a non-fungible token is sold by one user (such that an account associated with that user is increased accordingly) and bought by another user (such that an account associated with that user is decreased accordingly). In these embodiments, following a user obtaining a non-fungible token (with an initial set of non-fungible token attributes) and potentially following the user modifying, over time, one or more of the initial set of non-fungible token attributes with different attributes, the system enables the user to sell one or more of such attributes of the non-fungible token for an amount of currency. Following such a sale, the non-fungible token continues to exist without the sold attribute. For example, following the user upgrading the non-fungible token of FIG. 2C with the addition of digital content represented as a shirt, the user accesses, via the gaming device, an interface of the marketplace and posts a buy-now listing to sell the digital content represented as a shirt for the non-fungible token. In another example, following the user upgrading the non-fungible token of FIG. 2C with the addition of digital content represented as a shirt, the user accesses, via the gaming device, an interface of the marketplace and buys the digital content represented as a hat matching the shirt for the non-fungible token. Such a configuration introduces an element of liquidity to the non-fungible tokens created and/or modified by enabling the user to exchange part of an asset in the digital domain (i.e., the individual attribute of the non-fungible token) for an asset outside of the digital domain (i.e., the currency received).

In certain embodiments, the system enables a user to participate in transactions involving partial non-fungible tokens in which attributes of non-fungible tokens are traded from one user to another user. In these embodiments, following multiple users each obtaining a non-fungible token (with different initial sets of non-fungible token attributes) and potentially following one or more of these multiple users each modifying, over time, one or more of the respective initial sets of non-fungible token attributes with different attributes, the system enables the users to trade one or more attributes of their non-fungible tokens. Such a configuration introduces an element of liquidity to the non-fungible tokens created and/or modified by enabling the user to exchange a partial asset in the digital domain (i.e., an attributes of the user's current non-fungible token) for another asset in the digital domain (i.e., another user's current non-fungible token and/or one or more attributes of another user's current non-fungible token).

Accordingly, in certain embodiments, the system of the present disclosure causes a display, by a display device, of a first visual representation of a non-fungible token associated, in a blockchain, with a first user, the non-fungible token being created, in the blockchain, in association with an activity that occurred at a gaming device. In these embodiments, responsive to a marketplace transaction occurring between the first user and a second user in association with the non-fungible token, the system causes a modification, in the blockchain, of the non-fungible token, causes a modification of a first account associated with the first user, and causes a modification of a second account associated with the second user.

In certain such embodiments, the modification, in the blockchain, of the non-fungible token includes a modification of the non-fungible token from being associated with the first user to being associated with the second user. In these embodiments, the modification includes a purchase transaction.

In certain such embodiments, the modification, in the blockchain, of the non-fungible token includes a modification of a first attribute of the non-fungible token, the first attribute associated with the activity that occurred at the gaming device. In these embodiments, the marketplace transaction includes the first user selling the first attribute of the non-fungible token to the second user, the modification of the first account includes an increase, by a monetary amount, of the first account and the modification of the second account includes a decrease, by the monetary amount, of the second account.

In certain such embodiments, the modification, in the blockchain, of the non-fungible token includes a modification of a first attribute of the non-fungible token, the first attribute being independent of the activity that occurred at the gaming device. In these embodiments, the marketplace transaction includes the first user buying the first attribute of the non-fungible token from the second user, the modification of the first account includes a decrease, by a monetary amount, of the first account and the modification of the second account includes an increase, by the monetary amount, of the second account.

In certain such embodiments, the first visual representation of the non-fungible token includes a visual representation of a first attribute of the non-fungible token. In certain instances, the system causes a display, by the display device, of a second visual representation of the non-fungible token after the occurrence of the marketplace transaction, the second visual representation of the non-fungible token is a modified visual representation of the first attribute. In certain other instances, the system causes a display, by the display device, of a second visual representation of the non-fungible token after the occurrence of the marketplace transaction, the second visual representation of the non-fungible token includes no visual representation of the first attribute.

In certain additional or alternative embodiments, the system of the present disclosure causes a display, by a display device, of a visual representation of a non-fungible token includes a first attribute and created, in a blockchain, in association with an activity that occurred at a gaming device. In these embodiments, during a first period of time, the system enables a first marketplace transaction to occur in association with at least the first attribute of the non-fungible token, the first marketplace transaction being at least partially based on a first value of the first attribute of the non-fungible token. In these embodiments, during a second, different period of time, the system enables a second marketplace transaction to occur in association with at least the first attribute of the non-fungible token, the second marketplace transaction being at least partially based on a second, different value of the first attribute of the non-fungible token.

In certain such embodiments, the first attribute of the non-fungible token includes gaming session data. In these embodiments, the system enables a user, even an anonymous user, to transact (e.g., buy, sell, trade) certain data tracked via one or more gaming sessions.

In different embodiments, a game triggering event, a non-fungible token creation event, a non-fungible token modification event, and/or a non-fungible token distribution event occurs based on an outcome associated with one or more plays of any games. In one embodiment, such determinations are symbol driven based on the generation of one or more designated symbols or symbol combinations. In various embodiments, a generation of a designated symbol (or sub-symbol) or a designated set of symbols (or sub-symbols) over one or more plays of a primary game causes such conditions to be satisfied and/or one or more of such events to occur.

In different embodiments, the system does not provide any apparent reasons to the players for an occurrence of a game triggering event, a non-fungible token creation event, a non-fungible token modification event, and/or a non-fungible token distribution event. In these embodiments, such determinations are not triggered by an event in a game or based specifically on any of the plays of any games. That is, these events occur without any explanation or alternatively with simple explanations.

In one such embodiment, a game triggering event, a non-fungible token creation event, a non-fungible token modification event, and/or a non-fungible token distribution event occurs based on an amount of coin-in. In this embodiment, the system determines if an amount of coin-in reaches or exceeds a designated amount of coin-in (i.e., a threshold coin-in amount). Upon the amount of coin-in wagered reaching or exceeding the threshold coin-in amount, the system causes one or more of such events or conditions to occur. In another such embodiment, a game triggering event, a non-fungible token creation event, a non-fungible token modification event, and/or a non-fungible token distribution event occurs based on an amount of virtual currency-in. In this embodiment, the system determines if an amount of virtual currency-in wagered reaches or exceeds a designated amount of virtual currency-in (i.e., a threshold virtual currency-in amount). Upon the amount of virtual currency-in wagered reaching or exceeding the threshold virtual currency-in amount, the system causes one or more of such events or conditions to occur. In different embodiments, the threshold coin-in amount and/or the threshold virtual currency-in amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In one such embodiment, a game triggering event, a non-fungible token creation event, a non-fungible token modification event, and/or a non-fungible token distribution event occurs based on an amount of coin-out. In this embodiment, the system determines if an amount of coin-out reaches or exceeds a designated amount of coin-out (i.e., a threshold coin-out amount). Upon the amount of coin-out reaching or exceeding the threshold coin-out amount, the system causes one or more of such events or conditions to occur. In another such embodiment, a game triggering event, a non-fungible token creation event, a non-fungible token modification event, and/or a non-fungible token distribution event occurs based on an amount of virtual currency-out. In this embodiment, the system determines if an amount of virtual currency-out reaches or exceeds a designated amount of virtual currency-out (i.e., a threshold virtual currency-out amount). Upon the amount of virtual currency-out reaching or exceeding the threshold virtual currency-out amount, the system causes one or more of such events or conditions to occur. In different embodiments, the threshold coin-out amount and/or the threshold virtual currency-out amount is predetermined, randomly determined, determined based on a player's status (such as determined through a player tracking system), determined based on a generated symbol or symbol combination, determined based on a random determination by the central controller, determined based on a random determination at the gaming device, determined based on one or more side wagers placed, determined based on the player's primary game wager, determined based on time (such as the time of day) or determined based on any other suitable method or criteria.

In different embodiments, a game triggering event, a non-fungible token creation event, a non-fungible token modification event, and/or a non-fungible token distribution event occurs based on a predefined variable reaching a defined parameter threshold. For example, when the 500,000$^{th}$ player has played an EGM (ascertained from a player tracking system), one or more of such events or conditions occur. In different embodiments, the predefined parameter thresholds include a length of time, a length of time after a certain dollar amount is hit, a wager level threshold for a specific device (which EGM is the first to contribute $250,000), a number of EGMs active, or any other parameter that defines a suitable threshold.

In different embodiments, a game triggering event, a non-fungible token creation event, a non-fungible token modification event, and/or a non-fungible token distribution event occurs based on a quantity of games played. In this embodiment, a quantity of games played is set for when one or more of such events or conditions will occur. In one embodiment, such a set quantity of games played is based on historic data.

In different embodiments, a game triggering event, a non-fungible token creation event, a non-fungible token modification event, and/or a non-fungible token distribution event occurs based on time. In this embodiment, a time is set for when one or more of such events or conditions will occur. In one embodiment, such a set time is based on historic data.

In different embodiments, a game triggering event, a non-fungible token creation event, a non-fungible token modification event, and/or a non-fungible token distribution event occurs based upon system operator defined player eligibility parameters stored on a player tracking system (such as via a player tracking card or other suitable manner). In this embodiment, the parameters for eligibility are defined by the system operator based on any suitable criterion. In one embodiment, the system recognizes the player's identification (via the player tracking system) when the player inserts or otherwise associates their player tracking card in the EGM and/or logs into the player tracking system using a mobile device, such as a personal gaming device. The system determines the player tracking level of the player and if the current player tracking level defined by the system operator is eligible for one or more of such events or conditions. In one embodiment, the system operator defines minimum bet levels required for such events or conditions to occur based on the player's card level.

In different embodiments, a game triggering event, a non-fungible token creation event, a non-fungible token modification event, and/or a non-fungible token distribution event occurs based on a system determination, including one or more random selections by the central controller. For example, as described above, the system tracks all active EGMs and the wagers they placed, wherein based on the EGM's state as well as one or more wager pools associated with the EGM, the system determines whether to one or more of such events or conditions will occur. In one such embodiment, the player who consistently places a higher wager is more likely to be associated with an occurrence of one or more of such events or conditions than a player who consistently places a minimum wager. It should be appreciated that the criteria for determining whether a player is in active status or inactive status for determining if one or more of such events occur may the same as, substantially the same as, or different than the criteria for determining whether a player is in active status or inactive status for another one of such events to occur.

In different embodiments, a game triggering event, a non-fungible token creation event, a non-fungible token modification event, and/or a non-fungible token distribution event occurs based on a determination of if any numbers allotted to an EGM match a randomly selected number. In this embodiment, upon or prior to each play of each EGM, an EGM selects a random number from a range of numbers and during each primary game, the EGM allocates the first N numbers in the range, where N is the number of credits bet by the player in that primary game. At the end of the primary game, the randomly selected number is compared with the numbers allocated to the player and if a match occurs, one or more of such events or conditions occur.

It should be appreciated that any suitable manner of causing a game triggering event, a non-fungible token creation event, a non-fungible token modification event, and/or a non-fungible token distribution event to occur may be implemented in accordance with the system and method of the present disclosure. It should be further appreciated that one or more of the above-described triggers pertaining to a game triggering event, a non-fungible token creation event, a non-fungible token modification event, and/or a non-fungible token distribution event occurring may be combined in one or more different embodiments.

It should be appreciated that in different embodiments, one or more of: whether a non-fungible token creation event, a non-fungible token distribution event and/or a non-fungible token benefit triggering event occurs; a type of non-fungible token to create when a non-fungible token creation event occurs; one or more properties of a created non-fungible token; a type of non-fungible token to modify when a non-fungible token modification event occurs; one or more properties of a non-fungible token to modify upon a non-fungible token modification event; which modification to make to one or more properties of a non-fungible token; when to distribute non-fungible token when a non-fungible token distribution event occurs; how to distribute non-fungible token when a non-fungible token distribution event occurs; and/or any determination of the present disclosure is/are predetermined, randomly determined, randomly determined based on one or more weighted percentages, determined based on a generated symbol or symbol combination, determined independent of a generated symbol or symbol combination, determined based on a random determination by the central controller, determined independent of a random determination by the central controller, determined based on a random determination at the gaming table component, determined independent of a random determination at the gaming table component, determined based on at least one play of at least one game, determined independent of at least one play of at least one game, determined based on a user's selection, determined independent of a user's selection, determined based on one or more side wagers placed, determined independent of one or more side wagers placed, determined based on the user's primary game wager, determined independent of the user's primary game wager, determined based on time (such as the time of day), determined independent of time (such as the time of day), determined based on an amount of coin-in accumulated in one or more pools, determined independent of an amount of coin-in accumulated in one or more pools, determined based on a status of the user (i.e., a player tracking status), determined independent of a status of the user (i.e., a player tracking status), determined based on one or more other determinations of the present disclosure, determined independent of any other determination of the present disclosure or determined based on any other suitable method or criteria.

The above-described embodiments of the present disclosure may be implemented in accordance with or in conjunction with one or more of a variety of different types of systems, such as, but not limited to, those described below. As such, the present disclosure contemplates a variety of different systems each having one or more of a plurality of different features, attributes, or characteristics. A "system" as used herein refers to various configurations of: (a) one or more servers; (b) one or more electronic gaming machines; and/or (c) one or more personal gaming devices, such as desktop computers, laptop computers, tablet computers or computing devices, personal digital assistants, mobile phones, and other mobile computing devices. Thus, in various embodiments, the system of the present disclosure includes: (a) one or more electronic gaming machines in combination with one or more servers; (b) one or more personal gaming devices in combination with one or more servers; (c) one or more personal gaming devices in combination with one or more electronic gaming machines; (d) one or more personal gaming devices, one or more electronic gaming machines, and one or more servers in combination with one another; (e) a single electronic gaming machine; (f) a plurality of electronic gaming machines in combination with one another; (g) a single personal gaming device; (h) a plurality of personal gaming devices in combination with one another; (i) a single server; and/or (j) a plurality of servers in combination with one another. For brevity and clarity and unless specifically stated otherwise, "EGM" as used herein represents one EGM or a plurality of EGMs, "personal gaming device" as used herein represents one personal gaming device or a plurality of personal gaming devices, and "server" as used herein represents one server or a plurality of servers.

As noted above, in various embodiments, the system includes an EGM (or personal gaming device) in combination with a server. In such embodiments, the EGM (or personal gaming device) is configured to communicate with the server through a data network or remote communication link. In certain such embodiments, the EGM (or personal gaming device) is configured to communicate with another EGM (or personal gaming device) through the same data network or remote communication link or through a different data network or remote communication link. For example, the system includes a plurality of EGMs that are each configured to communicate with a server through a data network.

In certain embodiments in which the system includes an EGM (or personal gaming device) in combination with a server, the server is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the server. The at least one processor of that EGM (or personal gaming device) is configured to execute the events, messages, or commands represented by such data or signals in conjunction with the operation of the EGM (or personal gaming device). Moreover, the at least one processor of the server is configured to transmit and receive data or signals representing events, messages, commands, or any other suitable information between the server and the EGM (or personal gaming device). The at least one processor of the server is configured to execute the events, messages, or commands represented by such data or signals in conjunction with the operation of the server. One, more than one, or each of the functions of the server may be performed by the at least one processor of the EGM (or personal gaming device). Further, one, more than one, or each of the functions of the at least one processor of the EGM (or personal gaming device) may be performed by the at least one processor of the server.

In certain such embodiments, computerized instructions for controlling any games (such as any primary or base games and/or any secondary or bonus games) displayed by the EGM (or personal gaming device) are executed by the server. In such "thin client" embodiments, the server remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the server to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the system includes an EGM (or personal gaming device) and a server, computerized instructions for controlling any primary or base games displayed by the EGM (or personal gaming device) are communicated from the server to the EGM (or personal gaming device) in a thick client configuration, and computerized instructions for controlling any secondary or bonus games or other functions displayed by the EGM (or personal gaming device) are executed by the server in a thin client configuration.

In certain embodiments in which the system includes: (a) an EGM (or personal gaming device) configured to communicate with a server through a data network; and/or (b) a plurality of EGMs (or personal gaming devices) configured to communicate with one another through a data network, the data network is a local area network (LAN) in which the EGMs (or personal gaming devices) are located substantially proximate to one another and/or the server. In one example, the EGMs (or personal gaming devices) and the server are located in a gaming establishment or a portion of a gaming establishment.

In other embodiments in which the system includes: (a) an EGM (or personal gaming device) configured to communicate with a server through a data network; and/or (b) a plurality of EGMs (or personal gaming devices) configured to communicate with one another through a data network, the data network is a wide area network (WAN) in which one or more of the EGMs (or personal gaming devices) are not necessarily located substantially proximate to another one of the EGMs (or personal gaming devices) and/or the server. For example, one or more of the EGMs (or personal gaming devices) are located: (a) in an area of a gaming establishment different from an area of the gaming establishment in which the server is located; or (b) in a gaming establishment different from the gaming establishment in which the server is located. In another example, the server is not located within a gaming establishment in which the EGMs (or personal gaming devices) are located. In certain embodiments in which the data network is a WAN, the system includes a server and an EGM (or personal gaming device) each located in a different gaming establishment in a same geographic area, such as a same city or a same state. Systems in which the data network is a WAN are substantially identical to systems in which the data network is a LAN, though the quantity of EGMs (or personal gaming devices) in such systems may vary relative to one another.

In further embodiments in which the system includes: (a) an EGM (or personal gaming device) configured to communicate with a server through a data network; and/or (b) a plurality of EGMs (or personal gaming devices) configured to communicate with one another through a data network, the data network is an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the server identifies a player before enabling that player to place any wagers on any plays of any wagering games. In one example, the server identifies the player by requiring a player account of the player to be logged into via an input of a unique username and password combination assigned to the player. The server may, however, identify the player in any other suitable manner, such as by validating a player tracking identification number associated with the player; by reading a player tracking card or other smart card inserted into a card reader (as described below); by validating a unique player identification number associated with the player by the server; or by identifying the EGM (or personal gaming device), such as by identifying the MAC address or the IP address of the Internet facilitator. In various embodiments, once the server identifies the player, the server enables placement of one or more wagers on one or more plays of one or more primary or base games and/or one or more secondary or bonus games, and displays those plays via the Internet browser of the EGM (or personal gaming device).

The server and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

Figure 4:
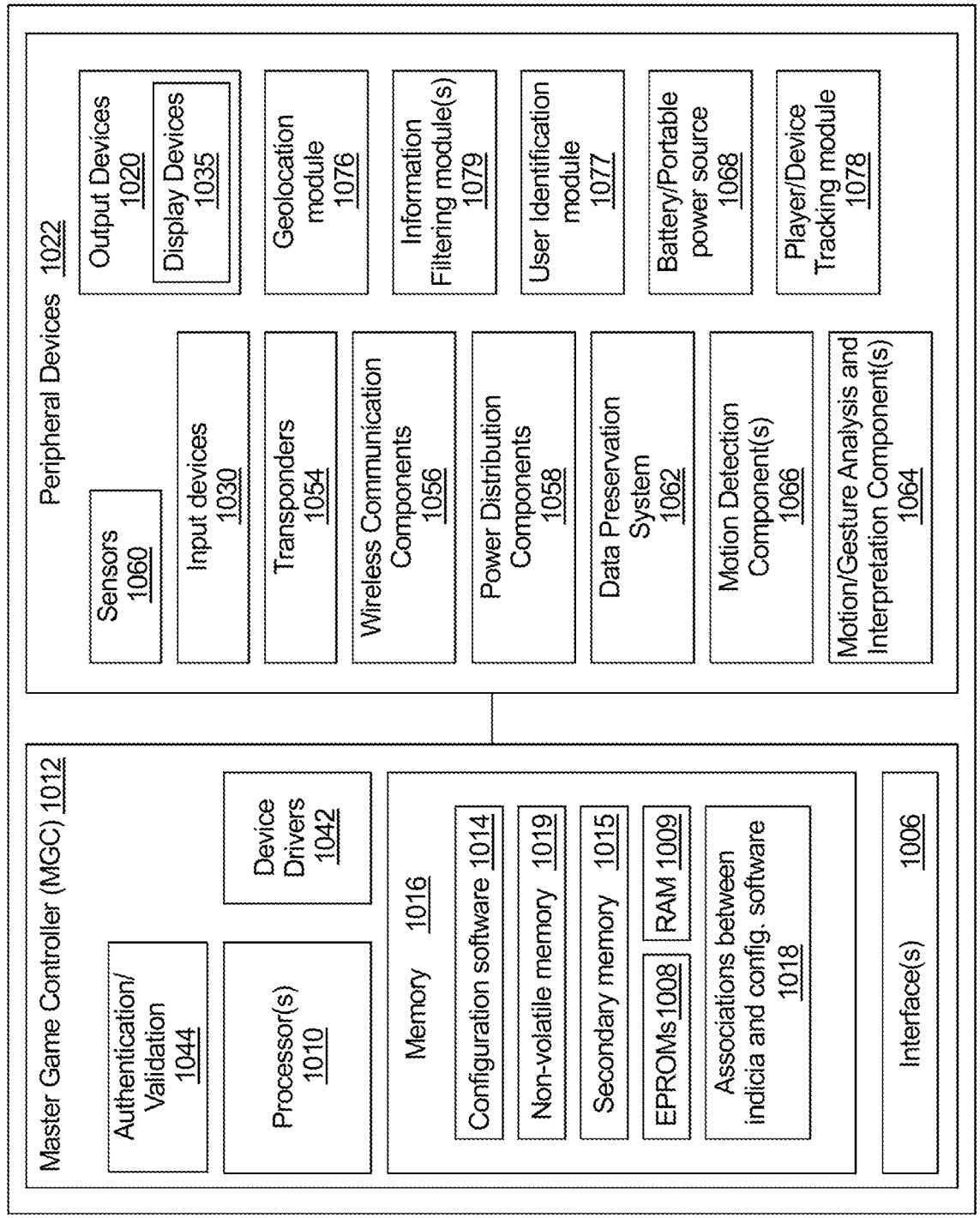
FIG. 4 is a schematic block diagram of one embodiment of an electronic configuration of an example system of the present disclosure.
Figure 5A:
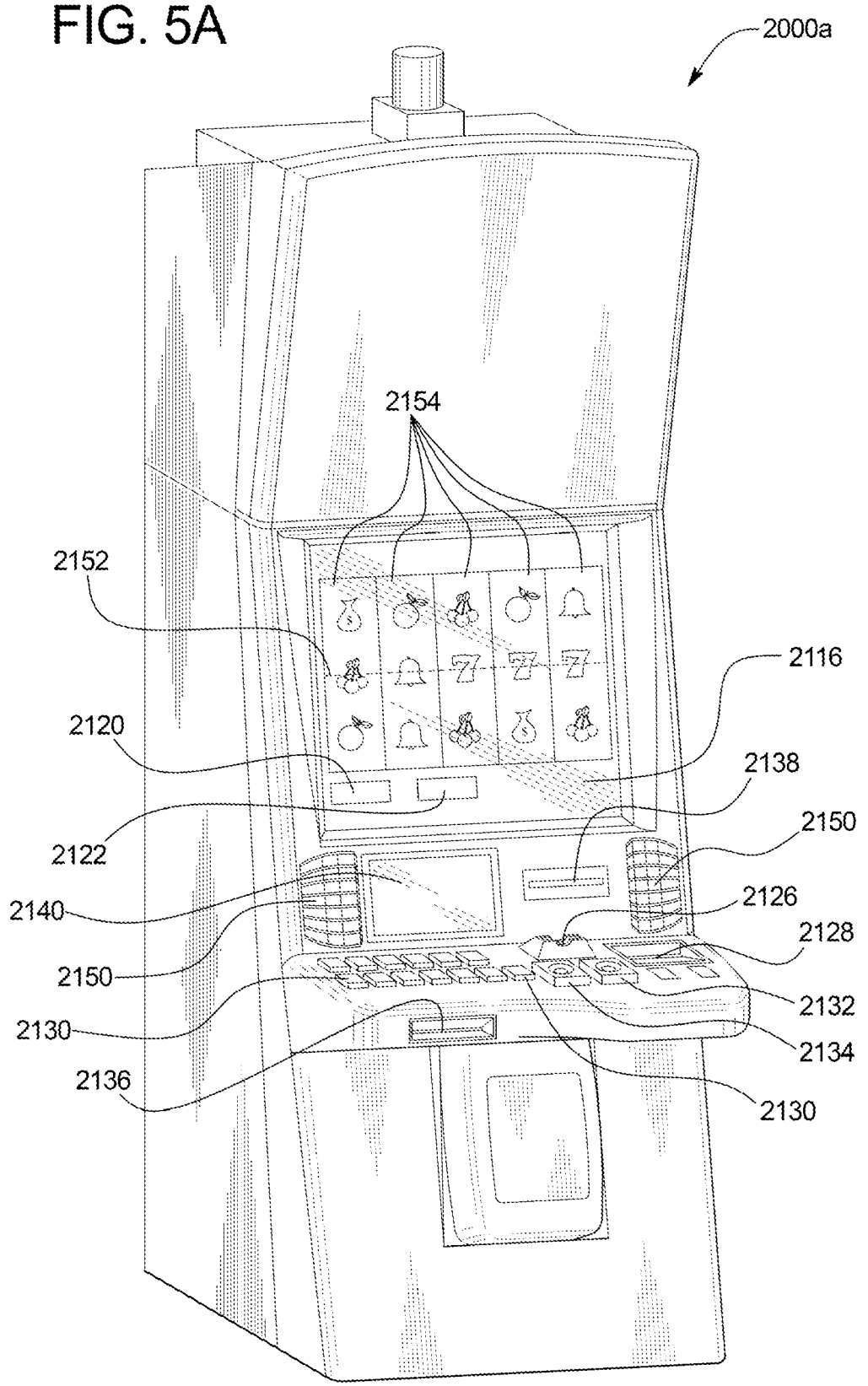
FIGS. 5A and 5B are perspective views of example alternative embodiments of the system of the present disclosure.
Figure 5B:
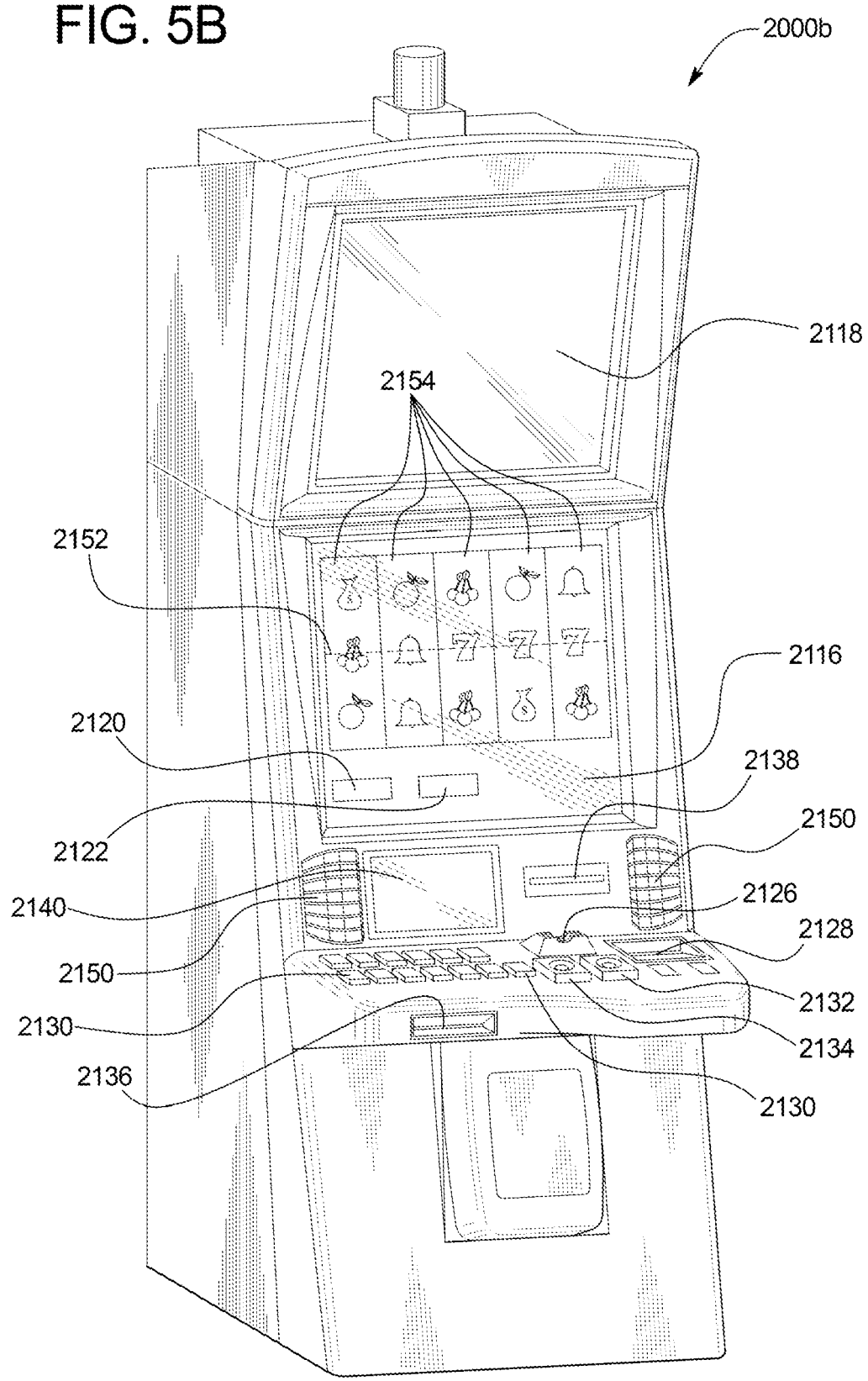
Figure 5C:
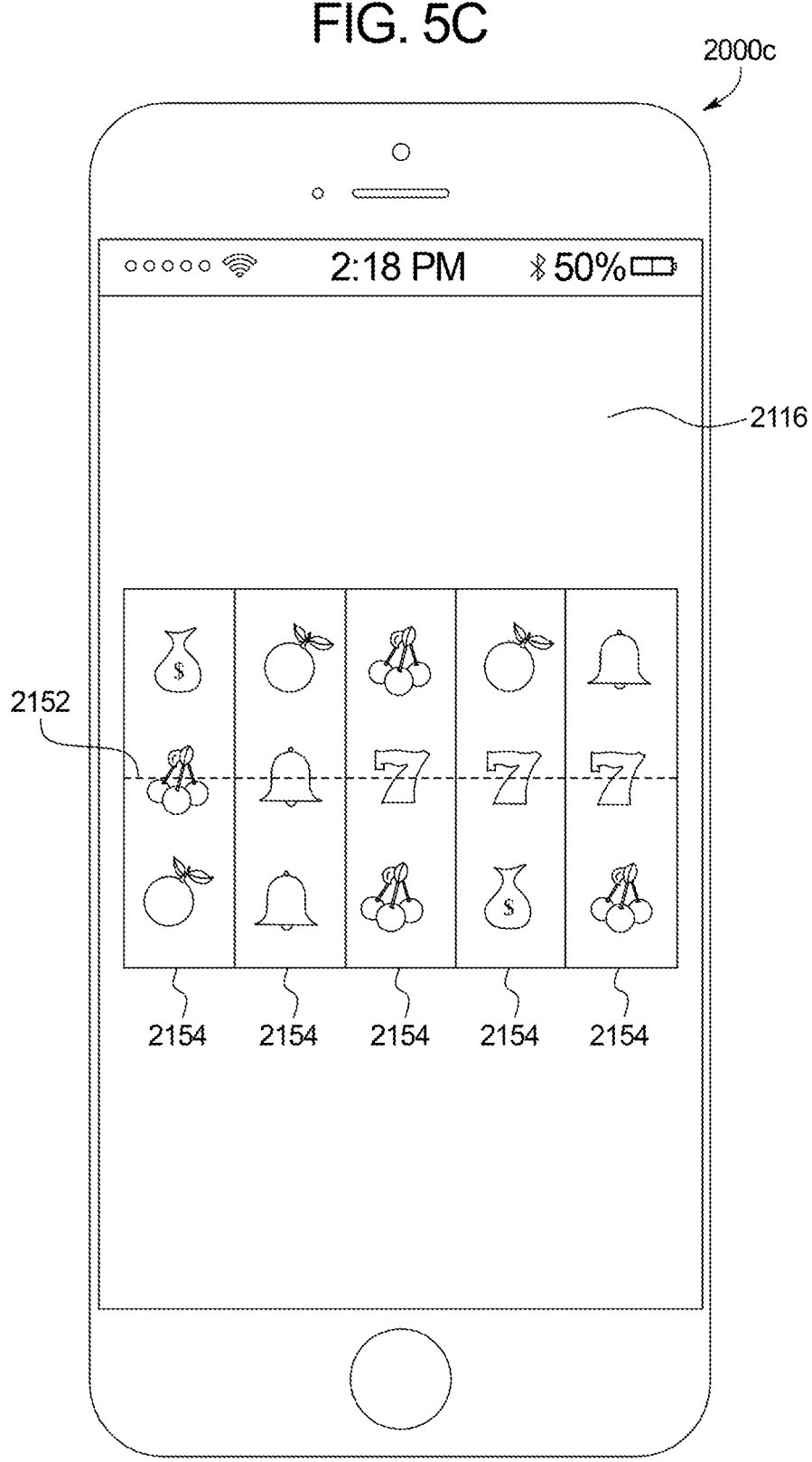
FIG. 5C is a front view of an example personal gaming device of the system of the present disclosure.

FIG. 4 is a block diagram of an example EGM 1000 and FIGS. 5A and 5B include two different example EGMs 2000*a* and 2000*b*. The EGMs 1000, 2000*a*, and 2000*b* are merely example EGMs, and different EGMs may be implemented using different combinations of the components shown in the EGMs 1000, 2000*a*, and 2000*b*. Although the below refers to EGMs, in various embodiments personal gaming devices (such as personal gaming device 2000*c* of FIG. 5C) may include some or all of the below components.

In these embodiments, the EGM 1000 includes a master gaming controller 1012 configured to communicate with and to operate with a plurality of peripheral devices 1022.

The master gaming controller 1012 includes at least one processor 1010. The at least one processor 1010 is any suitable processing device or set of processing devices, such as a microprocessor, a microcontroller-based platform, a suitable integrated circuit, or one or more application-specific integrated circuits (ASICs), configured to execute software enabling various configuration and reconfiguration tasks, such as: (1) communicating with a remote source (such as a server that stores authentication information or game information) via a communication interface 1006 of the master gaming controller 1012; (2) converting signals read by an interface to a format corresponding to that used by software or memory of the EGM; (3) accessing memory to configure or reconfigure game parameters in the memory according to indicia read from the EGM; (4) communicating with interfaces and the peripheral devices 1022 (such as input/output devices); and/or (5) controlling the peripheral devices 1022. In certain embodiments, one or more components of the master gaming controller 1012 (such as the at least one processor 1010) reside within a housing of the EGM (described below), while in other embodiments at least one component of the master gaming controller 1012 resides outside of the housing of the EGM.

The master gaming controller 1012 also includes at least one memory device 1016, which includes: (1) volatile memory (e.g., RAM 1009, which can include non-volatile RAM, magnetic RAM, ferroelectric RAM, and any other suitable forms); (2) non-volatile memory 1019 (e.g., disk memory, FLASH memory, EPROMs, EEPROMs, memristor-based non-volatile solid-state memory, etc.); (3) unalterable memory (e.g., EPROMs 1008); (4) read-only memory; and/or (5) a secondary memory storage device 1015, such as a non-volatile memory device, configured to store gaming software related information (the gaming software related information and the memory may be used to store various audio files and games not currently being used and invoked in a configuration or reconfiguration). Any other suitable magnetic, optical, and/or semiconductor memory may operate in conjunction with the EGM of the present disclosure. In certain embodiments, the at least one memory device 1016 resides within the housing of the EGM (described below), while in other embodiments at least one component of the at least one memory device 1016 resides outside of the housing of the EGM. In these embodiments, any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

The at least one memory device 1016 is configured to store, for example: (1) configuration software 1014, such as all the parameters and settings for a game playable on the EGM; (2) associations 1018 between configuration indicia read from an EGM with one or more parameters and settings; (3) communication protocols configured to enable the at least one processor 1010 to communicate with the peripheral devices 1022; and/or (4) communication transport protocols (such as TCP/IP, USB, Firewire, IEEE1394, Bluetooth, IEEE 802.11x (IEEE 802.11 standards), hiperlan/ 2, HomeRF, etc.) configured to enable the EGM to communicate with local and non-local devices using such protocols. In one implementation, the master gaming controller 1012 communicates with other devices using a serial communication protocol. A few non-limiting examples of serial communication protocols that other devices, such as peripherals (e.g., a bill validator or a ticket printer), may use to communicate with the master game controller 1012 include USB, RS-232, and Netplex (a proprietary protocol developed by IGT).

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Computer program code for carrying out operations for aspects of the present disclosure may be written in any combination of one or more programming languages, including an object oriented programming language such as Java, Scala, Smalltalk, Eiffel, JADE, Emerald, C++, C #, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

In certain embodiments, the at least one memory device 1016 is configured to store program code and instructions executable by the at least one processor of the EGM to control the EGM. The at least one memory device 1016 of the EGM also stores other operating data, such as image data, event data, input data, random number generators (RNGs) or pseudo-RNGs, paytable data or information, and/or applicable game rules that relate to the play of one or more games on the EGM. In various embodiments, part or all of the program code and/or the operating data described above is stored in at least one detachable or removable memory device including, but not limited to, a cartridge, a disk, a CD ROM, a DVD, a USB memory device, or any other suitable non-transitory computer readable medium. In certain such embodiments, an operator (such as a gaming establishment operator) and/or a player uses such a removable memory device in an EGM to implement at least part of the present disclosure. In other embodiments, part or all of the program code and/or the operating data is downloaded to the at least one memory device of the EGM through any suitable data network described above (such as an Internet or intranet).

The at least one memory device 1016 also stores a plurality of device drivers 1042. Examples of different types of device drivers include device drivers for EGM components and device drivers for the peripheral components 1022. Typically, the device drivers 1042 utilize various communication protocols that enable communication with a particular physical device. The device driver abstracts the hardware implementation of that device. For example, a device driver may be written for each type of card reader that could potentially be connected to the EGM. Non-limiting examples of communication protocols used to implement the device drivers include Netplex, USB, Serial, Ethernet 175, Firewire, I/O debouncer, direct memory map, serial, PCI, parallel, RF, Bluetooth™, near-field communications (e.g., using near-field magnetics), 802.11 (WiFi), etc. In one embodiment, when one type of a particular device is exchanged for another type of the particular device, the at least one processor of the EGM loads the new device driver from the at least one memory device to enable communication with the new device. For instance, one type of card reader in the EGM can be replaced with a second different type of card reader when device drivers for both card readers are stored in the at least one memory device.

In certain embodiments, the software units stored in the at least one memory device 1016 can be upgraded as needed. For instance, when the at least one memory device 1016 is a hard drive, new games, new game options, new parameters, new settings for existing parameters, new settings for new parameters, new device drivers, and new communication protocols can be uploaded to the at least one memory device 1016 from the master game controller 1012 or from some other external device. As another example, when the at least one memory device 1016 includes a CD/DVD drive including a CD/DVD configured to store game options, parameters, and settings, the software stored in the at least one memory device 1016 can be upgraded by replacing a first CD/DVD with a second CD/DVD. In yet another example, when the at least one memory device 1016 uses flash memory 1019 or EPROM 1008 units configured to store games, game options, parameters, and settings, the software stored in the flash and/or EPROM memory units can be upgraded by replacing one or more memory units with new memory units that include the upgraded software. In another embodiment, one or more of the memory devices, such as the hard drive, may be employed in a game software download process from a remote software server.

In some embodiments, the at least one memory device 1016 also stores authentication and/or validation components 1044 configured to authenticate/validate specified EGM components and/or information, such as hardware components, software components, firmware components, peripheral device components, user input device components, information received from one or more user input devices, information stored in the at least one memory device 1016, etc.

In certain embodiments, the peripheral devices 1022 include several device interfaces, such as: (1) at least one output device 1020 including at least one display device 1035; (2) at least one input device 1030 (which may include contact and/or non-contact interfaces); (3) at least one transponder 1054; (4) at least one wireless communication component 1056; (5) at least one wired/wireless power distribution component 1058; (6) at least one sensor 1060; (7) at least one data preservation component 1062; (8) at least one motion/gesture analysis and interpretation component 1064; (9) at least one motion detection component 1066; (10) at least one portable power source 1068; (11) at least one geolocation module 1076; (12) at least one user identification module 1077; (13) at least one player/device tracking module 1078; and (14) at least one information filtering module 1079.

The at least one output device 1020 includes at least one display device 1035 configured to display any game(s) displayed by the EGM and any suitable information associated with such game(s). In certain embodiments, the display devices are connected to or mounted on a housing of the EGM (described below). In various embodiments, the display devices serve as digital glass configured to advertise certain games or other aspects of the gaming establishment in which the EGM is located. In various embodiments, the EGM includes one or more of the following display devices: (a) a central display device; (b) a player tracking display configured to display various information regarding a player's player tracking status (as described below); (c) a secondary or upper display device in addition to the central display device and the player tracking display; (d) a credit display configured to display a current quantity of credits, amount of cash, account balance, or the equivalent; and (e) a bet display configured to display an amount wagered for one or more plays of one or more games. The example EGM 2000a illustrated in FIG. 5A includes a central display device 2116, a player tracking display 2140, a credit display 2120, and a bet display 2122. The example EGM 2000b illustrated in FIG. 5B includes a central display device 2116, an upper display device 2118, a player tracking display 2140, a credit display 2120, and a bet display 2122.

In various embodiments, the display devices include, without limitation: a monitor, a television display, a plasma display, a liquid crystal display (LCD), a display based on light emitting diodes (LEDs), a display based on a plurality of organic light-emitting diodes (OLEDs), a display based on polymer light-emitting diodes (PLEDs), a display based on a plurality of surface-conduction electron-emitters (SEDs), a display including a projected and/or reflected image, or any other suitable electronic device or display mechanism. In certain embodiments, as described above, the display device includes a touch-screen with an associated touch-screen controller. The display devices may be of any suitable sizes, shapes, and configurations.

The display devices of the EGM are configured to display one or more game and/or non-game images, symbols, and indicia. In certain embodiments, the display devices of the EGM are configured to display any suitable visual representation or exhibition of the movement of objects; dynamic lighting; video images; images of people, characters, places, things, and faces of cards; and the like. In certain embodiments, the display devices of the EGM are configured to display one or more video reels, one or more video wheels, and/or one or more video dice. In other embodiments, certain of the displayed images, symbols, and indicia are in mechanical form. That is, in these embodiments, the display device includes any electromechanical device, such as one or more rotatable wheels, one or more reels, and/or one or more dice, configured to display at least one or a plurality of game or other suitable images, symbols, or indicia.

In various embodiments, the at least one output device 1020 includes a payout device. In these embodiments, after the EGM receives an actuation of a cashout device (described below), the EGM causes the payout device to provide a payment to the player. In one embodiment, the payout device is one or more of: (a) a ticket printer and dispenser configured to print and dispense a ticket or credit slip associated with a monetary value, wherein the ticket or credit slip may be redeemed for its monetary value via a cashier, a kiosk, or other suitable redemption system; (b) a bill dispenser configured to dispense paper currency; (c) a coin dispenser configured to dispense coins or tokens (such as into a coin payout tray); and (d) any suitable combination thereof. The example EGMs 2000a and 2000b illustrated in FIGS. 5A and 5B each include a ticket printer and dispenser 2136.

In certain embodiments, rather than dispensing bills, coins, or a physical ticket having a monetary value to the player following receipt of an actuation of the cashout device, the payout device is configured to cause a payment to be provided to the player in the form of an electronic funds transfer, such as via a direct deposit into a bank account, a casino account, or a prepaid account of the player; via a transfer of funds onto an electronically recordable identification card or smart card of the player; or via sending a virtual ticket having a monetary value to an electronic device of the player.

While any credit balances, any wagers, any values, and any awards are described herein as amounts of monetary credits or currency, one or more of such credit balances, such wagers, such values, and such awards may be for non-monetary credits, promotional credits, of player tracking points or credits.

In certain embodiments, the at least one output device 1020 is a sound generating device controlled by one or more sound cards. In one such embodiment, the sound generating device includes one or more speakers or other sound generating hardware and/or software configured to generate sounds, such as by playing music for any games or by playing music for other modes of the EGM, such as an attract mode. The example EGMs 2000a and 2000b illustrated in FIGS. 5A and 5B each include a plurality of speakers 2150. In another such embodiment, the EGM provides dynamic sounds coupled with attractive multimedia images displayed on one or more of the display devices to provide an audio-visual representation or to otherwise display full-motion video with sound to attract players to the EGM. In certain embodiments, the EGM displays a sequence of audio and/or visual attraction messages during idle periods to attract potential players to the EGM. The videos may be customized to provide any appropriate information.

The at least one input device 1030 may include any suitable device that enables an input signal to be produced and received by the at least one processor 1010 of the EGM.

In one embodiment, the at least one input device 1030 includes a payment device configured to communicate with the at least one processor of the EGM to fund the EGM. In certain embodiments, the payment device includes one or more of: (a) a bill acceptor into which paper money is inserted to fund the EGM; (b) a ticket acceptor into which a ticket or a voucher is inserted to fund the EGM; (c) a coin slot into which coins or tokens are inserted to fund the EGM; (d) a reader or a validator for credit cards, debit cards, or credit slips into which a credit card, debit card, or credit slip is inserted to fund the EGM; (e) a player identification card reader into which a player identification card is inserted to fund the EGM; or (f) any suitable combination thereof. The example EGMs 2000a and 2000b illustrated in FIGS. 5A and 5B each include a combined bill and ticket acceptor 2128 and a coin slot 2126.

In one embodiment, the at least one input device 1030 includes a payment device configured to enable the EGM to be funded via an electronic funds transfer, such as a transfer of funds from a bank account. In another embodiment, the EGM includes a payment device configured to communicate with a mobile device of a player, such as a mobile phone, a radio frequency identification tag, or any other suitable wired or wireless device, to retrieve relevant information associated with that player to fund the EGM. When the EGM is funded, the at least one processor determines the amount of funds entered and displays the corresponding amount on a credit display or any other suitable display as described below.

In certain embodiments, the at least one input device 1030 includes at least one wagering or betting device. In various embodiments, the one or more wagering or betting devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). One such wagering or betting device is as a maximum wager or bet device that, when actuated, causes the EGM to place a maximum wager on a play of a game. Another such wagering or betting device is a repeat bet device that, when actuated, causes the EGM to place a wager that is equal to the previously-placed wager on a play of a game. A further such wagering or betting device is a bet one device that, when actuated, causes the EGM to increase the wager by one credit. Generally, upon actuation of one of the wagering or betting devices, the quantity of credits displayed in a credit meter (described below) decreases by the amount of credits wagered, while the quantity of credits displayed in a bet display (described below) increases by the amount of credits wagered.

In various embodiments, the at least one input device 1030 includes at least one game play activation device. In various embodiments, the one or more game play initiation devices are each: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). After a player appropriately funds the EGM and places a wager, the EGM activates the game play activation device to enable the player to actuate the game play activation device to initiate a play of a game on the EGM (or another suitable sequence of events associated with the EGM). After the EGM receives an actuation of the game play activation device, the EGM initiates the play of the game. The example EGMs 2000a and 2000b illustrated in FIGS. 5A and 5B each include a game play activation device in the form of a game play initiation button 2132. In other embodiments, the EGM begins game play automatically upon appropriate funding rather than upon utilization of the game play activation device.

In other embodiments, the at least one input device 1030 includes a cashout device. In various embodiments, the cashout device is: (1) a mechanical button supported by the housing of the EGM (such as a hard key or a programmable soft key), or (2) an icon displayed on a display device of the EGM (described below) that is actuatable via a touch screen of the EGM (described below) or via use of a suitable input device of the EGM (such as a mouse or a joystick). When the EGM receives an actuation of the cashout device from a player and the player has a positive (i.e., greater-than-zero) credit balance, the EGM initiates a payout associated with the player's credit balance. The example EGMs 2000*a* and 2000*b* illustrated in FIGS. 5A and 5B each include a cashout device in the form of a cashout button 2134.

In various embodiments, the at least one input device 1030 includes a plurality of buttons that are programmable by the EGM operator to, when actuated, cause the EGM to perform particular functions. For instance, such buttons may be hard keys, programmable soft keys, or icons icon displayed on a display device of the EGM (described below) that are actuatable via a touch screen of the EGM (described below) or via use of a suitable input device of the EGM (such as a mouse or a joystick). The example EGMs 2000*a* and 2000*b* illustrated in FIGS. 5A and 5B each include a plurality of such buttons 2130.

In certain embodiments, the at least one input device 1030 includes a touch-screen coupled to a touch-screen controller or other touch-sensitive display overlay to enable interaction with any images displayed on a display device (as described below). One such input device is a conventional touch-screen button panel. The touch-screen and the touch-screen controller are connected to a video controller. In these embodiments, signals are input to the EGM by touching the touch screen at the appropriate locations.

In embodiments including a player tracking system, as further described below, the at least one input device 1030 includes a card reader in communication with the at least one processor of the EGM. The example EGMs 2000*a* and 2000*b* illustrated in FIGS. 5A and 5B each include a card reader 2138. The card reader is configured to read a player identification card inserted into the card reader.

The at least one wireless communication component 1056 includes one or more communication interfaces having different architectures and utilizing a variety of protocols, such as (but not limited to) 802.11 (WiFi); 802.15 (including Bluetooth™); 802.16 (WiMax); 802.22; cellular standards such as CDMA, CDMA2000, and WCDMA; Radio Frequency (e.g., RFID); infrared; and Near Field Magnetic communication protocols. The at least one wireless communication component 1056 transmits electrical, electromagnetic, or optical signals that carry digital data streams or analog signals representing various types of information.

The at least one wired/wireless power distribution component 1058 includes components or devices that are configured to provide power to other devices. For example, in one embodiment, the at least one power distribution component 1058 includes a magnetic induction system that is configured to provide wireless power to one or more user input devices near the EGM. In one embodiment, a user input device docking region is provided, and includes a power distribution component that is configured to recharge a user input device without requiring metal-to-metal contact. In one embodiment, the at least one power distribution component 1058 is configured to distribute power to one or more internal components of the EGM, such as one or more rechargeable power sources (e.g., rechargeable batteries) located at the EGM.

In certain embodiments, the at least one sensor 1060 includes at least one of: optical sensors, pressure sensors, RF sensors, infrared sensors, image sensors, thermal sensors, and biometric sensors. The at least one sensor 1060 may be used for a variety of functions, such as: detecting movements and/or gestures of various objects within a predetermined proximity to the EGM; detecting the presence and/or identity of various persons (e.g., players, casino employees, etc.), devices (e.g., user input devices), and/or systems within a predetermined proximity to the EGM.

The at least one data preservation component 1062 is configured to detect or sense one or more events and/or conditions that, for example, may result in damage to the EGM and/or that may result in loss of information associated with the EGM. Additionally, the data preservation system 1062 may be operable to initiate one or more appropriate action(s) in response to the detection of such events/conditions.

The at least one motion/gesture analysis and interpretation component 1064 is configured to analyze and/or interpret information relating to detected player movements and/or gestures to determine appropriate player input information relating to the detected player movements and/or gestures. For example, in one embodiment, the at least one motion/gesture analysis and interpretation component 1064 is configured to perform one or more of the following functions: analyze the detected gross motion or gestures of a player; interpret the player's motion or gestures (e.g., in the context of a casino game being played) to identify instructions or input from the player; utilize the interpreted instructions/input to advance the game state; etc. In other embodiments, at least a portion of these additional functions may be implemented at a remote system or device.

The at least one portable power source 1068 enables the EGM to operate in a mobile environment. For example, in one embodiment, the EGM 300 includes one or more rechargeable batteries.

The at least one geolocation module 1076 is configured to acquire geolocation information from one or more remote sources and use the acquired geolocation information to determine information relating to a relative and/or absolute position of the EGM. For example, in one implementation, the at least one geolocation module 1076 is configured to receive GPS signal information for use in determining the position or location of the EGM. In another implementation, the at least one geolocation module 1076 is configured to receive multiple wireless signals from multiple remote devices (e.g., EGMs, servers, wireless access points, etc.) and use the signal information to compute position/location information relating to the position or location of the EGM.

The at least one user identification module 1077 is configured to determine the identity of the current user or current owner of the EGM. For example, in one embodiment, the current user is required to perform a login process at the EGM in order to access one or more features. Alternatively, the EGM is configured to automatically determine the identity of the current user based on one or more external signals, such as an RFID tag or badge worn by the current user and that provides a wireless signal to the EGM that is used to determine the identity of the current user. In at least one embodiment, various security features are incorporated into the EGM to prevent unauthorized users from accessing confidential or sensitive information.

The at least one information filtering module 1079 is configured to perform filtering (e.g., based on specified criteria) of selected information to be displayed at one or more displays 1035 of the EGM.

In various embodiments, the EGM includes a plurality of communication ports configured to enable the at least one processor of the EGM to communicate with and to operate with external peripherals, such as: accelerometers, arcade sticks, bar code readers, bill validators, biometric input devices, bonus devices, button panels, card readers, coin dispensers, coin hoppers, display screens or other displays or video sources, expansion buses, information panels, keypads, lights, mass storage devices, microphones, motion sensors, motors, printers, reels, SCSI ports, solenoids, speakers, thumbsticks, ticket readers, touch screens, trackballs, touchpads, wheels, and wireless communication devices.

As generally described above, in certain embodiments, such as the example EGMs 2000a and 2000b illustrated in FIGS. 5A and 5B, the EGM has a support structure, housing, or cabinet that provides support for a plurality of the input devices and the output devices of the EGM. Further, the EGM is configured such that a player may operate it while standing or sitting. In various embodiments, the EGM is positioned on a base or stand, or is configured as a pub-style tabletop game (not shown) that a player may operate typically while sitting. As illustrated by the different example EGMs 2000a and 2000b shown in FIGS. 5A and 5B, EGMs may have varying housing and display configurations.

In certain embodiments, the EGM is a device that has obtained approval from a regulatory gaming commission, and in other embodiments, the EGM is a device that has not obtained approval from a regulatory gaming commission.

The EGMs described above are merely three examples of different types of EGMs. Certain of these example EGMs may include one or more elements that may not be included in all systems, and these example EGMs may not include one or more elements that are included in other systems. For example, certain EGMs include a coin acceptor while others do not.

In various embodiments, an EGM may be implemented in one of a variety of different configurations. In various embodiments, the EGM may be implemented as one of: (a) a dedicated EGM in which computerized game programs executable by the EGM for controlling any primary or base games (referred to herein as "primary games") and/or any secondary or bonus games or other functions (referred to herein as "secondary games") displayed by the EGM are provided with the EGM before delivery to a gaming establishment or before being provided to a player; and (b) a changeable EGM in which computerized game programs executable by the EGM for controlling any primary games and/or secondary games displayed by the EGM are downloadable or otherwise transferred to the EGM through a data network or remote communication link; from a USB drive, flash memory card, or other suitable memory device; or in any other suitable manner after the EGM is physically located in a gaming establishment or after the EGM is provided to a player.

As generally explained above, in various embodiments in which the system includes a server and a changeable EGM, the at least one memory device of the server stores different game programs and instructions executable by the at least one processor of the changeable EGM to control one or more primary games and/or secondary games displayed by the changeable EGM. More specifically, each such executable game program represents a different game or a different type of game that the at least one changeable EGM is configured to operate. In one example, certain of the game programs are executable by the changeable EGM to operate games having the same or substantially the same game play but different paytables. In different embodiments, each executable game program is associated with a primary game, a secondary game, or both. In certain embodiments, an executable game program is executable by the at least one processor of the at least one changeable EGM as a secondary game to be played simultaneously with a play of a primary game (which may be downloaded to or otherwise stored on the at least one changeable EGM), or vice versa.

In operation of such embodiments, the server is configured to communicate one or more of the stored executable game programs to the at least one processor of the changeable EGM. In different embodiments, a stored executable game program is communicated or delivered to the at least one processor of the changeable EGM by: (a) embedding the executable game program in a device or a component (such as a microchip to be inserted into the changeable EGM); (b) writing the executable game program onto a disc or other media; or (c) uploading or streaming the executable game program over a data network (such as a dedicated data network). After the executable game program is communicated from the server to the changeable EGM, the at least one processor of the changeable EGM executes the executable game program to enable the primary game and/or the secondary game associated with that executable game program to be played using the display device(s) and/or the input device(s) of the changeable EGM. That is, when an executable game program is communicated to the at least one processor of the changeable EGM, the at least one processor of the changeable EGM changes the game or the type of game that may be played using the changeable EGM.

In certain embodiments, the system randomly determines any game outcome(s) (such as a win outcome) and/or award(s) (such as a quantity of credits to award for the win outcome) for a play of a primary game and/or a play of a secondary game based on probability data. In certain such embodiments, this random determination is provided through utilization of an RNG, such as a true RNG or a pseudo RNG, or any other suitable randomization process. In one such embodiment, each game outcome or award is associated with a probability, and the system generates the game outcome(s) and/or the award(s) to be provided based on the associated probabilities. In these embodiments, since the system generates game outcomes and/or awards randomly or based on one or more probability calculations, there is no certainty that the system will ever provide any specific game outcome and/or award.

In certain embodiments, the system maintains one or more predetermined pools or sets of predetermined game outcomes and/or awards. In certain such embodiments, upon generation or receipt of a game outcome and/or award request, the system independently selects one of the predetermined game outcomes and/or awards from the one or more pools or sets. The system flags or marks the selected game outcome and/or award as used. Once a game outcome or an award is flagged as used, it is prevented from further selection from its respective pool or set; that is, the system does not select that game outcome or award upon another game outcome and/or award request. The system provides the selected game outcome and/or award.

In certain embodiments, the system determines a predetermined game outcome and/or award based on the results of a bingo, keno, or lottery game. In certain such embodiments, the system utilizes one or more bingo, keno, or lottery games to determine the predetermined game outcome and/or award provided for a primary game and/or a secondary game. The system is provided or associated with a bingo card. Each bingo card consists of a matrix or array of elements, wherein each element is designated with separate indicia. After a bingo card is provided, the system randomly selects or draws a plurality of the elements. As each element is selected, a determination is made as to whether the selected element is present on the bingo card. If the selected element is present on the bingo card, that selected element on the provided bingo card is marked or flagged. This process of selecting elements and marking any selected elements on the provided bingo cards continues until one or more predetermined patterns are marked on one or more of the provided bingo cards. After one or more predetermined patterns are marked on one or more of the provided bingo cards, game outcome and/or award is determined based, at least in part, on the selected elements on the provided bingo cards.

In certain embodiments in which the system includes a server and an EGM, the EGM is configured to communicate with the server for monitoring purposes only. In such embodiments, the EGM determines the game outcome(s) and/or award(s) to be provided in any of the manners described above, and the server monitors the activities and events occurring on the EGM. In one such embodiment, the system includes a real-time or online accounting and gaming information system configured to communicate with the server. In this embodiment, the accounting and gaming information system includes: (a) a player database configured to store player profiles, (b) a player tracking module configured to track players (as described below), and (c) a credit system configured to provide automated transactions.

As noted above, in various embodiments, the system includes one or more executable game programs executable by at least one processor of the system to provide one or more primary games and one or more secondary games. The primary game(s) and the secondary game(s) may comprise any suitable games and/or wagering games, such as, but not limited to: electromechanical or video slot or spinning reel type games; video card games such as video draw poker, multi-hand video draw poker, other video poker games, video blackjack games, and video baccarat games; video keno games; video bingo games; and video selection games.

In certain embodiments in which the primary game is a slot or spinning reel type game, the system includes one or more reels in either an electromechanical form with mechanical rotating reels or in a video form with simulated reels and movement thereof. Each reel displays a plurality of indicia or symbols, such as bells, hearts, fruits, numbers, letters, bars, or other images that typically correspond to a theme associated with the system. In certain such embodiments, the system includes one or more paylines associated with the reels. The example EGM 2000*b* shown in FIG. 5B includes a payline 2152 and a plurality of reels 2154. In certain embodiments, one or more of the reels are independent reels or unisymbol reels. In such embodiments, each independent reel generates and displays one symbol.

In various embodiments, one or more of the paylines is horizontal, vertical, circular, diagonal, angled, or any suitable combination thereof. In other embodiments, each of one or more of the paylines is associated with a plurality of adjacent symbol display areas on a requisite number of adjacent reels. In one such embodiment, one or more paylines are formed between at least two symbol display areas that are adjacent to each other by either sharing a common side or sharing a common corner (i.e., such paylines are connected paylines). The system enables a wager to be placed on one or more of such paylines to activate such paylines. In other embodiments in which one or more paylines are formed between at least two adjacent symbol display areas, the system enables a wager to be placed on a plurality of symbol display areas, which activates those symbol display areas.

In various embodiments, the system provides one or more awards after a spin of the reels when specified types and/or configurations of the indicia or symbols on the reels occur on an active payline or otherwise occur in a winning pattern, occur on the requisite number of adjacent reels, and/or occur in a scatter pay arrangement.

In certain embodiments, the system employs a ways to win award determination. In these embodiments, any outcome to be provided is determined based on a number of associated symbols that are generated in active symbol display areas on the requisite number of adjacent reels (i.e., not on paylines passing through any displayed winning symbol combinations). If a winning symbol combination is generated on the reels, one award for that occurrence of the generated winning symbol combination is provided.

In various embodiments, the system includes a progressive award. Typically, a progressive award includes an initial amount and an additional amount funded through a portion of each wager placed to initiate a play of a primary game. When one or more triggering events occurs, the system provides at least a portion of the progressive award. After the system provides the progressive award, an amount of the progressive award is reset to the initial amount and a portion of each subsequent wager is allocated to the next progressive award.

As generally noted above, in addition to providing winning credits or other awards for one or more plays of the primary game(s), in various embodiments the system provides credits or other awards for one or more plays of one or more secondary games. The secondary game typically enables an award to be obtained addition to any award obtained through play of the primary game(s). The secondary game(s) typically produces a higher level of player excitement than the primary game(s) because the secondary game(s) provides a greater expectation of winning than the primary game(s) and is accompanied with more attractive or unusual features than the primary game(s). The secondary game(s) may be any type of suitable game, either similar to or completely different from the primary game.

In various embodiments, the system automatically provides or initiates the secondary game upon the occurrence of a triggering event or the satisfaction of a qualifying condition. In other embodiments, the system initiates the secondary game upon the occurrence of the triggering event or the satisfaction of the qualifying condition and upon receipt of an initiation input. In certain embodiments, the triggering event or qualifying condition is a selected outcome in the primary game(s) or a particular arrangement of one or more indicia on a display device for a play of the primary game(s), such as a "BONUS" symbol appearing on three adjacent reels along a payline following a spin of the reels for a play of the primary game. In other embodiments, the triggering event or qualifying condition occurs based on a certain amount of game play (such as number of games, number of credits, amount of time) being exceeded, or based on a specified number of points being earned during game play. Any suitable triggering event or qualifying condition or any suitable combination of a plurality of different triggering events or qualifying conditions may be employed.

In other embodiments, at least one processor of the system randomly determines when to provide one or more plays of one or more secondary games. In one such embodiment, no apparent reason is provided for providing the secondary game. In this embodiment, qualifying for a secondary game is not triggered by the occurrence of an event in any primary game or based specifically on any of the plays of any primary game. That is, qualification is provided without any explanation or, alternatively, with a simple explanation. In another such embodiment, the system determines qualification for a secondary game at least partially based on a game triggered or symbol triggered event, such as at least partially based on play of a primary game.

In various embodiments, after qualification for a secondary game has been determined, the secondary game participation may be enhanced through continued play on the primary game. Thus, in certain embodiments, for each secondary game qualifying event, such as a secondary game symbol, that is obtained, a given number of secondary game wagering points or credits is accumulated in a "secondary game meter" configured to accrue the secondary game wagering credits or entries toward eventual participation in the secondary game. In one such embodiment, the occurrence of multiple such secondary game qualifying events in the primary game results in an arithmetic or exponential increase in the number of secondary game wagering credits awarded. In another such embodiment, any extra secondary game wagering credits may be redeemed during the secondary game to extend play of the secondary game.

In certain embodiments, no separate entry fee or buy-in for the secondary game is required. That is, entry into the secondary game cannot be purchased; rather, in these embodiments entry must be won or earned through play of the primary game, thereby encouraging play of the primary game. In other embodiments, qualification for the secondary game is accomplished through a simple "buy-in." For example, qualification through other specified activities is unsuccessful, payment of a fee or placement of an additional wager "buys-in" to the secondary game. In certain embodiments, a separate side wager must be placed on the secondary game or a wager of a designated amount must be placed on the primary game to enable qualification for the secondary game. In these embodiments, the secondary game triggering event must occur and the side wager (or designated primary game wager amount) must have been placed for the secondary game to trigger.

In various embodiments in which the system includes a plurality of EGMs, the EGMs are configured to communicate with one another to provide a group gaming environment. In certain such embodiments, the EGMs enable players of those EGMs to work in conjunction with one another, such as by enabling the players to play together as a team or group, to win one or more awards. In other such embodiments, the EGMs enable players of those EGMs to compete against one another for one or more awards. In one such embodiment, the EGMs enable the players of those EGMs to participate in one or more gaming tournaments for one or more awards.

In various embodiments, the system includes one or more player tracking systems. Such player tracking systems enable operators of the system (such as casinos or other gaming establishments) to recognize the value of customer loyalty by identifying frequent customers and rewarding them for their patronage. Such a player tracking system is configured to track a player's gaming activity. In one such embodiment, the player tracking system does so through the use of player tracking cards. In this embodiment, a player is issued a player identification card that has an encoded player identification number that uniquely identifies the player. When the player's playing tracking card is inserted into a card reader of the system to begin a gaming session, the card reader reads the player identification number off the player tracking card to identify the player. The system timely tracks any suitable information or data relating to the identified player's gaming session. The system also timely tracks when the player tracking card is removed to conclude play for that gaming session. In another embodiment, rather than requiring insertion of a player tracking card into the card reader, the system utilizes one or more portable devices, such as a mobile phone, a radio frequency identification tag, or any other suitable wireless device, to track when a gaming session begins and ends. In another embodiment, the system utilizes any suitable biometric technology or ticket technology to track when a gaming session begins and ends.

In such embodiments, during one or more gaming sessions, the system tracks any suitable information or data, such as any amounts wagered, average wager amounts, and/or the time at which these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In various embodiments, such tracked information and/or any suitable feature associated with the player tracking system is displayed on a player tracking display. In various embodiments, such tracked information and/or any suitable feature associated with the player tracking system is displayed via one or more service windows that are displayed on the central display device and/or the upper display device.

In various embodiments, the system includes one or more servers configured to communicate with a personal gaming device—such as a smartphone, a tablet computer, a desktop computer, or a laptop computer—to enable web-based game play using the personal gaming device. In various embodiments, the player must first access a gaming website via an Internet browser of the personal gaming device or execute an application (commonly called an "app") installed on the personal gaming device before the player can use the personal gaming device to participate in web-based game play. In certain embodiments, the one or more servers and the personal gaming device operate in a thin-client environment. In these embodiments, the personal gaming device receives inputs via one or more input devices (such as a touch screen and/or physical buttons), the personal gaming device sends the received inputs to the one or more servers, the one or more servers make various determinations based on the inputs and determine content to be displayed (such as a randomly determined game outcome and corresponding award), the one or more servers send the content to the personal gaming device, and the personal gaming device displays the content.

In certain such embodiments, the one or more servers must identify the player before enabling game play on the personal gaming device (or, in some embodiments, before enabling monetary wager-based game play on the personal gaming device). In these embodiments, the player must identify herself to the one or more servers, such as by inputting the player's unique username and password combination, providing an input to a biometric sensor (e.g., a fingerprint sensor, a retinal sensor, a voice sensor, or a facial-recognition sensor), or providing any other suitable information.

Once identified, the one or more servers enable the player to establish an account balance from which the player can draw credits usable to wager on plays of a game. In certain embodiments, the one or more servers enable the player to initiate an electronic funds transfer to transfer funds from a bank account to the player's account balance. In other embodiments, the one or more servers enable the player to make a payment using the player's credit card, debit card, or other suitable device to add money to the player's account balance. In other embodiments, the one or more servers enable the player to add money to the player's account balance via a peer-to-peer type application, such as PayPal or Venmo. The one or more servers also enable the player to cash out the player's account balance (or part of it) in any suitable manner, such as via an electronic funds transfer, by initiating creation of a paper check that is mailed to the player, or by initiating printing of a voucher at a kiosk in a gaming establishment.

In certain embodiments, the one or more servers include a payment server that handles establishing and cashing out players' account balances and a separate game server configured to determine the outcome and any associated award for a play of a game. In these embodiments, the game server is configured to communicate with the personal gaming device and the payment device, and the personal gaming device and the payment device are not configured to directly communicate with one another. In these embodiments, when the game server receives data representing a request to start a play of a game at a desired wager, the game server sends data representing the desired wager to the payment server. The payment server determines whether the player's account balance can cover the desired wager (i.e., includes a monetary balance at least equal to the desired wager).

If the payment server determines that the player's account balance cannot cover the desired wager, the payment server notifies the game server, which then instructs the personal gaming device to display a suitable notification to the player that the player's account balance is too low to place the desired wager. If the payment server determines that the player's account balance can cover the desired wager, the payment server deducts the desired wager from the account balance and notifies the game server. The game server then determines an outcome and any associated award for the play of the game. The game server notifies the payment server of any nonzero award, and the payment server increases the player's account balance by the nonzero award. The game server sends data representing the outcome and any award to the personal gaming device, which displays the outcome and any award.

In certain embodiments, the one or more servers enable web-based game play using a personal gaming device only if the personal gaming device satisfies one or more jurisdictional requirements. In one embodiment, the one or more servers enable web-based game play using the personal gaming device only if the personal gaming device is located within a designated geographic area (such as within certain state or county lines or within the boundaries of a gaming establishment). In this embodiment, the geolocation module of the personal gaming device determines the location of the personal gaming device and sends the location to the one or more servers, which determine whether the personal gaming device is located within the designated geographic area. In various embodiments, the one or more servers enable non-monetary wager-based game play if the personal gaming device is located outside of the designated geographic area.

In various embodiments, the system includes an EGM configured to communicate with a personal gaming device—such as a smartphone, a tablet computer, a desktop computer, or a laptop computer—to enable tethered mobile game play using the personal gaming device. Generally, in these embodiments, the EGM establishes communication with the personal gaming device and enables the player to play games on the EGM remotely via the personal gaming device. In certain embodiments, the system includes a geo-fence system that enables tethered game play within a particular geographic area but not outside of that geographic area.

In certain embodiments, the system is configured to communicate with a social network server that hosts or partially hosts a social networking website via a data network (such as the Internet) to integrate a player's gaming experience with the player's social networking account. This enables the system to send certain information to the social network server that the social network server can use to create content (such as text, an image, and/or a video) and post it to the player's wall, newsfeed, or similar area of the social networking website accessible by the player's connections (and in certain cases the public) such that the player's connections can view that information. This also enables the system to receive certain information from the social network server, such as the player's likes or dislikes or the player's list of connections. In certain embodiments, the system enables the player to link the player's player account to the player's social networking account(s). This enables the system to, once it identifies the player and initiates a gaming session (such as via the player logging in to a website (or an application) on the player's personal gaming device or via the player inserting the player's player tracking card into an EGM), link that gaming session to the player's social networking account(s). In other embodiments, the system enables the player to link the player's social networking account(s) to individual gaming sessions when desired by providing the required login information.

For instance, in one embodiment, if a player wins a particular award (e.g., a progressive award or a jackpot award) or an award that exceeds a certain threshold (e.g., an award exceeding $1,000), the system sends information about the award to the social network server to enable the server to create associated content (such as a screenshot of the outcome and associated award) and to post that content to the player's wall (or other suitable area) of the social networking website for the player's connections to see (and to entice them to play). In another embodiment, if a player joins a multiplayer game and there is another seat available, the system sends that information to the social network sever to enable the server to create associated content (such as text indicating a vacancy for that particular game) and to post that content to the player's wall (or other suitable area) of the social networking website for the player's connections to see (and to entice them to fill the vacancy). In another embodiment, if the player consents, the system sends advertisement information or offer information to the social network server to enable the social network server to create associated content (such as text or an image reflecting an advertisement and/or an offer) and to post that content to the player's wall (or other suitable area) of the social networking website for the player's connections to see. In another embodiment, the system enables the player to recommend a game to the player's connections by posting a recommendation to the player's wall (or other suitable area) of the social networking website.

Certain of the systems described herein, such as EGMs located in a casino or another gaming establishment, include certain components and/or are configured to operate in certain manners that differentiate these systems from general purpose computing devices, i.e., certain personal gaming devices such as desktop computers and laptop computers.

For instance, EGMs are highly regulated to ensure fairness and, in many cases, EGMs are configured to award monetary awards up to multiple millions of dollars. To satisfy security and regulatory requirements in a gaming environment, hardware and/or software architectures are implemented in EGMs that differ significantly from those of general purpose computing devices. For purposes of illustration, a description of EGMs relative to general purpose computing devices and some examples of these additional (or different) hardware and/or software architectures found in EGMs are described below.

At first glance, one might think that adapting general purpose computing device technologies to the gaming industry and EGMs would be a simple proposition because both general purpose computing devices and EGMs employ processors that control a variety of devices. However, due to at least: (1) the regulatory requirements placed on EGMs, (2) the harsh environment in which EGMs operate, (3) security requirements, and (4) fault tolerance requirements, adapting general purpose computing device technologies to EGMs can be quite difficult. Further, techniques and methods for solving a problem in the general purpose computing device industry, such as device compatibility and connectivity issues, might not be adequate in the gaming industry. For instance, a fault or a weakness tolerated in a general purpose computing device, such as security holes in software or frequent crashes, is not tolerated in an EGM because in an EGM these faults can lead to a direct loss of funds from the EGM, such as stolen cash or loss of revenue when the EGM is not operating properly or when the random outcome determination is manipulated.

Certain differences between general purpose computing devices and EGMs are described below. A first difference between EGMs and general purpose computing devices is that EGMs are state-based systems. A state-based system stores and maintains its current state in a non-volatile memory such that, in the event of a power failure or other malfunction, the state-based system can return to that state when the power is restored or the malfunction is remedied. For instance, for a state-based EGM, if the EGM displays an award for a game of chance but the power to the EGM fails before the EGM provides the award to the player, the EGM stores the pre-power failure state in a non-volatile memory, returns to that state upon restoration of power, and provides the award to the player. This requirement affects the software and hardware design on EGMs. General purpose computing devices are not state-based machines, and a majority of data is usually lost when a malfunction occurs on a general purpose computing device.

A second difference between EGMs and general purpose computing devices is that, for regulatory purposes, the software on the EGM utilized to operate the EGM has been designed to be static and monolithic to prevent cheating by the operator of the EGM. For instance, one solution that has been employed in the gaming industry to prevent cheating and to satisfy regulatory requirements has been to manufacture an EGM that can use a proprietary processor running instructions to provide the game of chance from an EPROM or other form of non-volatile memory. The coding instructions on the EPROM are static (non-changeable) and must be approved by a gaming regulators in a particular jurisdiction and installed in the presence of a person representing the gaming jurisdiction. Any changes to any part of the software required to generate the game of chance, such as adding a new device driver used to operate a device during generation of the game of chance, can require burning a new EPROM approved by the gaming jurisdiction and reinstalling the new EPROM on the EGM in the presence of a gaming regulator. Regardless of whether the EPROM solution is used, to gain approval in most gaming jurisdictions, an EGM must demonstrate sufficient safeguards that prevent an operator or a player of an EGM from manipulating the EGM's hardware and software in a manner that gives him an unfair, and in some cases illegal, advantage.

A third difference between EGMs and general purpose computing devices is authentication—EGMs storing code are configured to authenticate the code to determine if the code is unaltered before executing the code. If the code has been altered, the EGM prevents the code from being executed. The code authentication requirements in the gaming industry affect both hardware and software designs on EGMs. Certain EGMs use hash functions to authenticate code. For instance, one EGM stores game program code, a hash function, and an authentication hash (which may be encrypted). Before executing the game program code, the EGM hashes the game program code using the hash function to obtain a result hash and compares the result hash to the authentication hash. If the result hash matches the authentication hash, the EGM determines that the game program code is valid and executes the game program code. If the result hash does not match the authentication hash, the EGM determines that the game program code has been altered (i.e., may have been tampered with) and prevents execution of the game program code.

A fourth difference between EGMs and general purpose computing devices is that EGMs have unique peripheral device requirements that differ from those of a general purpose computing device, such as peripheral device security requirements not usually addressed by general purpose computing devices. For instance, monetary devices, such as coin dispensers, bill validators, and ticket printers and computing devices that are used to govern the input and output of cash or other items having monetary value (such as tickets) to and from an EGM have security requirements that are not typically addressed in general purpose computing devices. Therefore, many general purpose computing device techniques and methods developed to facilitate device connectivity and device compatibility do not address the emphasis placed on security in the gaming industry.

To address some of the issues described above, a number of hardware/software components and architectures are utilized in EGMs that are not typically found in general purpose computing devices. These hardware/software components and architectures, as described below in more detail, include but are not limited to watchdog timers, voltage monitoring systems, state-based software architecture and supporting hardware, specialized communication interfaces, security monitoring, and trusted memory.

Certain EGMs use a watchdog timer to provide a software failure detection mechanism. In a normally-operating EGM, the operating software periodically accesses control registers in the watchdog timer subsystem to "re-trigger" the watchdog. Should the operating software fail to access the control registers within a preset timeframe, the watchdog timer will timeout and generate a system reset. Typical watchdog timer circuits include a loadable timeout counter register to enable the operating software to set the timeout interval within a certain range of time. A differentiating feature of some circuits is that the operating software cannot completely disable the function of the watchdog timer. In other words, the watchdog timer always functions from the time power is applied to the board.

Certain EGMs use several power supply voltages to operate portions of the computer circuitry. These can be generated in a central power supply or locally on the computer board. If any of these voltages falls out of the tolerance limits of the circuitry they power, unpredictable operation of the EGM may result. Though most modern general purpose computing devices include voltage monitoring circuitry, these types of circuits only report voltage status to the operating software. Out of tolerance voltages can cause software malfunction, creating a potential uncontrolled condition in the general purpose computing device.

Certain EGMs have power supplies with relatively tighter voltage margins than that required by the operating circuitry. In addition, the voltage monitoring circuitry implemented in certain EGMs typically has two thresholds of control. The first threshold generates a software event that can be detected by the operating software and an error condition then generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the EGM.

As described above, certain EGMs are state-based machines. Different functions of the game provided by the EGM (e.g., bet, play, result, points in the graphical presentation, etc.) may be defined as a state. When the EGM moves a game from one state to another, the EGM stores critical data regarding the game software in a custom non-volatile memory subsystem. This ensures that the player's wager and credits are preserved and to minimize potential disputes in the event of a malfunction on the EGM. In general, the EGM does not advance from a first state to a second state until critical information that enables the first state to be reconstructed has been stored. This feature enables the EGM to recover operation to the current state of play in the event of a malfunction, loss of power, etc. that occurred just before the malfunction. In at least one embodiment, the EGM is configured to store such critical information using atomic transactions.

Generally, an atomic operation in computer science refers to a set of operations that can be combined so that they appear to the rest of the system to be a single operation with only two possible outcomes: success or failure. As related to data storage, an atomic transaction may be characterized as series of database operations which either all occur, or all do not occur. A guarantee of atomicity prevents updates to the database occurring only partially, which can result in data corruption.

To ensure the success of atomic transactions relating to critical information to be stored in the EGM memory before a failure event (e.g., malfunction, loss of power, etc.), memory that includes one or more of the following criteria be used: direct memory access capability; data read/write capability which meets or exceeds minimum read/write access characteristics (such as at least 5.08 Mbytes/sec (Read) and/or at least 38.0 Mbytes/sec (Write)). Memory devices that meet or exceed the above criteria may be referred to as "fault-tolerant" memory devices.

Typically, battery-backed RAM devices may be configured to function as fault-tolerant devices according to the above criteria, whereas flash RAM and/or disk drive memory are typically not configurable to function as fault-tolerant devices according to the above criteria. Accordingly, battery-backed RAM devices are typically used to preserve EGM critical data, although other types of non-volatile memory devices may be employed. These memory devices are typically not used in typical general purpose computing devices.

Thus, in at least one embodiment, the EGM is configured to store critical information in fault-tolerant memory (e.g., battery-backed RAM devices) using atomic transactions. Further, in at least one embodiment, the fault-tolerant memory is able to successfully complete all desired atomic transactions (e.g., relating to the storage of EGM critical information) within a time period of 200 milliseconds or less. In at least one embodiment, the time period of 200 milliseconds represents a maximum amount of time for which sufficient power may be available to the various EGM components after a power outage event has occurred at the EGM.

As described previously, the EGM may not advance from a first state to a second state until critical information that enables the first state to be reconstructed has been atomically stored. After the state of the EGM is restored during the play of a game of chance, game play may resume and the game may be completed in a manner that is no different than if the malfunction had not occurred. Thus, for example, when a malfunction occurs during a game of chance, the EGM may be restored to a state in the game of chance just before when the malfunction occurred. The restored state may include metering information and graphical information that was displayed on the EGM in the state before the malfunction. For example, when the malfunction occurs during the play of a card game after the cards have been dealt, the EGM may be restored with the cards that were previously displayed as part of the card game. As another example, a bonus game may be triggered during the play of a game of chance in which a player is required to make a number of selections on a video display screen. When a malfunction has occurred after the player has made one or more selections, the EGM may be restored to a state that shows the graphical presentation just before the malfunction including an indication of selections that have already been made by the player. In general, the EGM may be restored to any state in a plurality of states that occur in the game of chance that occurs while the game of chance is played or to states that occur between the play of a game of chance.

Game history information regarding previous games played such as an amount wagered, the outcome of the game, and the like may also be stored in a non-volatile memory device. The information stored in the non-volatile memory may be detailed enough to reconstruct a portion of the graphical presentation that was previously presented on the EGM and the state of the EGM (e.g., credits) at the time the game of chance was played. The game history information may be utilized in the event of a dispute. For example, a player may decide that in a previous game of chance that they did not receive credit for an award that they believed they won. The game history information may be used to reconstruct the state of the EGM before, during, and/or after the disputed game to demonstrate whether the player was correct or not in the player's assertion.

Another feature of EGMs is that they often include unique interfaces, including serial interfaces, to connect to specific subsystems internal and external to the EGM. The serial devices may have electrical interface requirements that differ from the "standard" EIA serial interfaces provided by general purpose computing devices. These interfaces may include, for example, Fiber Optic Serial, optically coupled serial interfaces, current loop style serial interfaces, etc. In addition, to conserve serial interfaces internally in the EGM, serial devices may be connected in a shared, daisy-chain fashion in which multiple peripheral devices are connected to a single serial channel.

The serial interfaces may be used to transmit information using communication protocols that are unique to the gaming industry. For example, IGT's Netplex is a proprietary communication protocol used for serial communication between EGMs. As another example, SAS is a communication protocol used to transmit information, such as metering information, from an EGM to a remote device. Often SAS is used in conjunction with a player tracking system.

Certain EGMs may alternatively be treated as peripheral devices to a casino communication controller and connected in a shared daisy chain fashion to a single serial interface. In both cases, the peripheral devices are assigned device addresses. If so, the serial controller circuitry must implement a method to generate or detect unique device addresses. General purpose computing device serial ports are not able to do this.

Security monitoring circuits detect intrusion into an EGM by monitoring security switches attached to access doors in the EGM cabinet. Access violations result in suspension of game play and can trigger additional security operations to preserve the current state of game play. These circuits also function when power is off by use of a battery backup. In power-off operation, these circuits continue to monitor the access doors of the EGM. When power is restored, the EGM can determine whether any security violations occurred while power was off, e.g., via software for reading status registers. This can trigger event log entries and further data authentication operations by the EGM software.

Trusted memory devices and/or trusted memory sources are included in an EGM to ensure the authenticity of the software that may be stored on less secure memory subsystems, such as mass storage devices. Trusted memory devices and controlling circuitry are typically designed to not enable modification of the code and data stored in the memory device while the memory device is installed in the EGM. The code and data stored in these devices may include authentication algorithms, random number generators, authentication keys, operating system kernels, etc. The purpose of these trusted memory devices is to provide gaming regulatory authorities a root trusted authority within the computing environment of the EGM that can be tracked and verified as original. This may be accomplished via removal of the trusted memory device from the EGM computer and verification of the secure memory device contents is a separate third party verification device. Once the trusted memory device is verified as authentic, and based on the approval of the verification algorithms included in the trusted device, the EGM is enabled to verify the authenticity of additional code and data that may be located in the gaming computer assembly, such as code and data stored on hard disk drives.

In at least one embodiment, at least a portion of the trusted memory devices/sources may correspond to memory that cannot easily be altered (e.g., "unalterable memory") such as EPROMS, PROMS, Bios, Extended Bios, and/or other memory sources that are able to be configured, verified, and/or authenticated (e.g., for authenticity) in a secure and controlled manner.

According to one embodiment, when a trusted information source is in communication with a remote device via a network, the remote device may employ a verification scheme to verify the identity of the trusted information source. For example, the trusted information source and the remote device may exchange information using public and private encryption keys to verify each other's identities. In another embodiment, the remote device and the trusted information source may engage in methods using zero knowledge proofs to authenticate each of their respective identities.

EGMs storing trusted information may utilize apparatuses or methods to detect and prevent tampering. For instance, trusted information stored in a trusted memory device may be encrypted to prevent its misuse. In addition, the trusted memory device may be secured behind a locked door. Further, one or more sensors may be coupled to the memory device to detect tampering with the memory device and provide some record of the tampering. In yet another example, the memory device storing trusted information might be designed to detect tampering attempts and clear or erase itself when an attempt at tampering has been detected.

Mass storage devices used in a general purpose computing devices typically enable code and data to be read from and written to the mass storage device. In a gaming environment, modification of the gaming code stored on a mass storage device is strictly controlled and would only be enabled under specific maintenance type events with electronic and physical enablers required. Though this level of security could be provided by software, EGMs that include mass storage devices include hardware level mass storage data protection circuitry that operates at the circuit level to monitor attempts to modify data on the mass storage device and will generate both software and hardware error triggers should a data modification be attempted without the proper electronic and physical enablers being present.

It should be appreciated that the terminology used herein is for the purpose of describing particular aspects only and is not intended to be limiting of the disclosure. For example, the singular forms "a", "an" and "the" are intended to include the plural forms as well, unless the context clearly indicates otherwise. In another example, the terms "including" and "comprising" and variations thereof, when used in this specification, specify the presence of stated features, steps, operations, elements, and/or components, but do not preclude the presence or addition of one or more other features, steps, operations, elements, components, and/or groups thereof. Additionally, a listing of items does not imply that any or all of the items are mutually exclusive nor does a listing of items imply that any or all of the items are collectively exhaustive of anything or in a particular order, unless expressly specified otherwise. Moreover, as used herein, the term "and/or" includes any and all combinations of one or more of the associated listed items. It should be further appreciated that headings of sections provided in this document and the title are for convenience only, and are not to be taken as limiting the disclosure in any way. Furthermore, unless expressly specified otherwise, devices that are in communication with each other need not be in continuous communication with each other and may communicate directly or indirectly through one or more intermediaries.

Various changes and modifications to the present embodiments described herein will be apparent to those skilled in the art. For example, a description of an embodiment with several components in communication with each other does not imply that all such components are required, or that each of the disclosed components must communicate with every other component. On the contrary, a variety of optional components are described to illustrate the wide variety of possible embodiments of the present disclosure. As such, these changes and modifications can be made without departing from the spirit and scope of the present subject matter and without diminishing its intended technical scope. It is therefore intended that such changes and modifications be covered by the appended claims.

The invention claimed is:

1. A system comprising:
   a processor; and
   a memory device that stores a plurality of instructions that, when executed by the processor, cause the processor to:
   cause a display, by a display device, of a first visual representation of a non-fungible token associated, in a blockchain, with a first user, the non-fungible token being created, in the blockchain, in association with an activity that occurred at a gaming device, and responsive to a marketplace transaction occurring between the first user and a second user in association with the non-fungible token:
cause a modification, in the blockchain, of the non-fungible token,
cause a modification of a first account associated with the first user, and
cause a modification of a second account associated with the second user.

2. The system of claim 1, wherein the modification, in the blockchain, of the non-fungible token comprises a modification of a first attribute of the non-fungible token, the first attribute associated with the activity that occurred at the gaming device.

3. The system of claim 2, wherein the marketplace transaction comprises the first user selling the first attribute of the non-fungible token to the second user, the modification of the first account comprises an increase, by a monetary amount, of the first account and the modification of the second account comprises a decrease, by the monetary amount, of the second account.

4. The system of claim 1, wherein the modification, in the blockchain, of the non-fungible token comprises a modification of a first attribute of the non-fungible token, the first attribute being independent of the activity that occurred at the gaming device.

5. The system of claim 4, wherein the marketplace transaction comprises the first user buying the first attribute of the non-fungible token from the second user, the modification of the first account comprises a decrease, by a monetary amount, of the first account and the modification of the second account comprises an increase, by the monetary amount, of the second account.

6. The system of claim 1, wherein the first visual representation of the non-fungible token comprises a visual representation of a first attribute of the non-fungible token.

7. The system of claim 6, wherein the memory device stores a plurality of further instructions that, when executed by the processor, cause the processor to cause a display, by the display device, of a second visual representation of the non-fungible token after the occurrence of the marketplace transaction, the second visual representation of the non-fungible token comprising a modified visual representation of the first attribute.

8. The system of claim 6, wherein the memory device stores a plurality of further instructions that, when executed by the processor, cause the processor to cause a display, by the display device, of a second visual representation of the non-fungible token after the occurrence of the marketplace transaction, the second visual representation of the non-fungible token comprising no visual representation of the first attribute.

9. The system of claim 1, wherein the modification, in the blockchain, of the non-fungible token comprises a modification of the non-fungible token from being associated with the first user to being associated with the second user.

10. A system comprising:
a processor; and
a memory device that stores a plurality of instructions that, when executed by the processor, cause the processor to:
cause a display, by a display device, of a visual representation of a non-fungible token comprising a first attribute and created, in a blockchain, in association with an activity that occurred at a gaming device,
during a first period of time, enable a first marketplace transaction to occur in association with at least the first attribute of the non-fungible token, the first marketplace transaction being at least partially based on a first value of the first attribute of the non-fungible token, and
during a second, different period of time, enable a second marketplace transaction to occur in association with at least the first attribute of the non-fungible token, the second marketplace transaction being at least partially based on a second, different value of the first attribute of the non-fungible token.

11. The system of claim 10, wherein the first attribute of the non-fungible token comprises gaming session data.

12. A method of operating a system, the method comprising:
displaying, by a display device, a first visual representation of a non-fungible token associated, in a blockchain, with a first user, the non-fungible token being created, in the blockchain, in association with an activity that occurred at a gaming device, and
responsive to a marketplace transaction occurring between the first user and a second user in association with the non-fungible token:
causing, by a processor, a modification, in the blockchain, of the non-fungible token,
causing, by the processor, a modification of a first account associated with the first user, and
causing, by the processor, of a modification of a second account associated with the second user.

13. The method of claim 12, wherein the modification, in the blockchain, of the non-fungible token comprises a modification of a first attribute of the non-fungible token, the first attribute associated with the activity that occurred at the gaming device.

14. The method of claim 13, wherein the marketplace transaction comprises the first user selling the first attribute of the non-fungible token to the second user, the modification of the first account comprises an increase, by a monetary amount, of the first account and the modification of the second account comprises a decrease, by the monetary amount, of the second account.

15. The method of claim 12, wherein the modification, in the blockchain, of the non-fungible token comprises a modification of a first attribute of the non-fungible token, the first attribute being independent of the activity that occurred at the gaming device.

16. The method of claim 15, wherein the marketplace transaction comprises the first user buying the first attribute of the non-fungible token from the second user, the modification of the first account comprises a decrease, by a monetary amount, of the first account and the modification of the second account comprises an increase, by the monetary amount, of the second account.

17. The method of claim 12, wherein the first visual representation of the non-fungible token comprises a visual representation of a first attribute of the non-fungible token.

18. The method of claim 17, further comprising displaying, by the display device, a second visual representation of the non-fungible token after the occurrence of the marketplace transaction, the second visual representation of the non-fungible token comprising a modified visual representation of the first attribute.

19. The method of claim 17, further comprising displaying, by the display device, a second visual representation of the non-fungible token after the occurrence of the marketplace transaction, the second visual representation of the non-fungible token comprising no visual representation of the first attribute.

20. The method of claim 12, wherein the modification, in the blockchain, of the non-fungible token comprises a modification of the non-fungible token from being associated with the first user to being associated with the second user.

\* \* \* \* \*